US009961443B2

(12) United States Patent
Yen et al.

(10) Patent No.: US 9,961,443 B2
(45) Date of Patent: May 1, 2018

(54) MICROPHONE SIGNAL FUSION

(71) Applicant: Knowles Electronics, LLC, Itasca, IL (US)

(72) Inventors: Kuan-Chieh Yen, Foster City, CA (US); Thomas E. Miller, Arlington Heights, IL (US); Mushtaq Syed, Santa Clara, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days. days.

(21) Appl. No.: 15/213,203

(22) Filed: Jul. 18, 2016

(65) Prior Publication Data

US 2017/0078790 A1 Mar. 16, 2017

Related U.S. Application Data

(63) Continuation of application No. 14/853,947, filed on Sep. 14, 2015, now Pat. No. 9,401,158.

(51) Int. Cl.
*H04B 15/00* (2006.01)
*H04R 3/00* (2006.01)
(Continued)

(52) U.S. Cl.
CPC .......... *H04R 3/005* (2013.01); *G10L 21/0216* (2013.01); *G10L 21/0232* (2013.01);
(Continued)

(58) Field of Classification Search
CPC ............ H04R 2420/00; H04R 2420/01; H04R 2420/07; H04R 2460/00; H04R 2460/01;
(Continued)

(56) References Cited

U.S. PATENT DOCUMENTS 2,535,063 A 12/1950 Halstead
3,995,113 A 11/1976 Tani
(Continued)

FOREIGN PATENT DOCUMENTS

CN 204119490 U 1/2015
CN 204145685 U 2/2015
(Continued)

OTHER PUBLICATIONS

Non-Final Office Action, dated Mar. 10, 2004, U.S. Appl. No. 10/138,929, filed May 3, 2002.
(Continued)

*Primary Examiner* — Leshui Zhang
(74) *Attorney, Agent, or Firm* — Foley & Lardner LLP

(57) ABSTRACT

Provided are systems and methods for microphone signal fusion. An example method commences with receiving a first and second signal representing sounds captured, respectively, by external and internal microphones. The internal microphone is located inside an ear canal and sealed for isolation from outside acoustic signals. The external microphone is located outside the ear canal. The first signal comprises a voice component. The second signal comprises a voice component modified by at least human tissue. The first and second signals are processed to obtain noise estimates. The voice component of the second signal is aligned with the voice component of the first signal. The first signal and the aligned voice component of the second signal are blended, based on the noise estimates, to generate an enhanced voice signal. Prior to aligning, the voice component of the second signal may be processed to emphasize high frequency content, improving effective alignment bandwidth.

19 Claims, 8 Drawing Sheets

(51) Int. Cl.
*G10L 21/0216* (2013.01)
*G10L 21/0232* (2013.01)
*G10L 21/0308* (2013.01)
*H04R 1/10* (2006.01)
*H04R 1/40* (2006.01)

(52) U.S. Cl.
CPC ............................... *G10L 21/0308* (2013.01); *G10L 2021/02165* (2013.01); *G10L 2021/02166* (2013.01); *H04R 1/1016* (2013.01); *H04R 1/1041* (2013.01); *H04R 1/1083* (2013.01); *H04R 1/406* (2013.01); *H04R 2201/107* (2013.01); *H04R 2225/43* (2013.01); *H04R 2410/05* (2013.01); *H04R 2420/07* (2013.01); *H04R 2430/03* (2013.01); *H04R 2460/13* (2013.01); *H04R 2499/11* (2013.01)

(58) Field of Classification Search
CPC ............ H04R 2460/03; H04R 2460/05; H04R 2460/09; H04R 2460/11; H04R 2460/15; H04R 2201/00; H04R 2201/003; H04R 2201/02; H04R 2201/10; H04R 2201/107; H04R 2201/109; H04R 2201/34; H04R 2201/40; H04R 2201/405; H04R 2225/00; H04R 2225/023; H04R 2225/025; H04R 2225/39; H04R 2225/41; H04R 2225/43; H04R 2225/53; H04R 2225/55; H04R 2225/61; H04R 3/005; H04R 2410/05; G10L 21/0205; G10L 21/0232; G10L 2021/02087
USPC ...... 381/312, 316, 317, 318, 320, 321, 71.1, 381/71.6, 71.8, 71.11, 71.12, 71.13, 381/71.14, 72, 73.1, 74, 92, 93, 94.1, 381/94.2, 74.3, 94.4, 94.5, 74.7, 94.9, 95, 381/97, 98, 99, 100, 101, 102, 103, 119, 381/122, 111, 112, 113, 114, 115, 123, 381/58, 314, 110; 700/94; 455/575.2, 455/569.1, 569.2, 570
See application file for complete search history.

(56) References Cited

U.S. PATENT DOCUMENTS 4,150,262 A 4/1979 Ono
4,455,675 A 6/1984 Bose et al.
4,516,428 A 5/1985 Konomi
4,520,238 A 5/1985 Ikeda
4,588,867 A 5/1986 Konomi
4,596,903 A 6/1986 Yoshizawa
4,644,581 A 2/1987 Sapiejewski
4,652,702 A 3/1987 Yoshii
4,696,045 A 9/1987 Rosenthal
4,975,967 A 12/1990 Rasmussen
5,208,867 A 5/1993 Stites, III
5,222,050 A 6/1993 Marren et al.
5,251,263 A 10/1993 Andrea et al.
5,282,253 A 1/1994 Konomi
5,289,273 A 2/1994 Lang
5,295,193 A 3/1994 Ono
5,305,387 A 4/1994 Sapiejewski
5,319,717 A 6/1994 Holesha
5,327,506 A 7/1994 Stites, III
D360,691 S 7/1995 Mostardo
D360,948 S 8/1995 Mostardo
D360,949 S 8/1995 Mostardo
5,490,220 A 2/1996 Loeppert
5,734,621 A 3/1998 Ito
5,870,482 A 2/1999 Loeppert et al.
D414,493 S 9/1999 Jiann-Yeong
5,960,093 A 9/1999 Miller
5,983,073 A 11/1999 Ditzik
6,044,279 A 3/2000 Hokao et al.
6,061,456 A 5/2000 Andrea et al.
6,094,492 A 7/2000 Boesen
6,118,878 A 9/2000 Jones
6,122,388 A 9/2000 Feldman
6,130,953 A 10/2000 Wilton et al.
6,184,652 B1 2/2001 Yang
6,211,649 B1 4/2001 Matsuda
6,219,408 B1 4/2001 Kurth
6,255,800 B1 7/2001 Bork
D451,089 S 11/2001 Hohl et al.
6,362,610 B1 3/2002 Yang
6,373,942 B1 4/2002 Braund
6,408,081 B1 6/2002 Boesen
6,462,668 B1 10/2002 Foseide
6,535,460 B2 3/2003 Loeppert et al.
6,567,524 B1 5/2003 Svean et al.
6,661,901 B1 * 12/2003 Svean .................. H04R 1/1083 381/317
6,683,965 B1 1/2004 Sapiejewski
6,694,180 B1 2/2004 Boesen
6,717,537 B1 4/2004 Fang et al.
6,738,485 B1 5/2004 Boesen
6,748,095 B1 6/2004 Goss
6,751,326 B2 6/2004 Nepomuceno
6,754,358 B1 6/2004 Boesen et al.
6,754,359 B1 6/2004 Svean et al.
6,801,632 B2 10/2004 Olson
6,847,090 B2 1/2005 Loeppert
6,879,698 B2 4/2005 Boesen
6,920,229 B2 7/2005 Boesen
6,931,292 B1 8/2005 Brumitt et al.
6,937,738 B2 8/2005 Armstrong et al.
6,987,859 B2 1/2006 Loeppert et al.
7,023,066 B2 4/2006 Lee et al.
7,024,010 B2 4/2006 Saunders et al.
7,039,195 B1 5/2006 Svean et al.
7,103,188 B1 9/2006 Jones
7,132,307 B2 11/2006 Wang et al.
7,136,500 B2 11/2006 Collins
7,203,331 B2 4/2007 Boesen
7,209,569 B2 4/2007 Boesen
7,215,790 B2 5/2007 Boesen et al.
7,289,636 B2 10/2007 Saunders et al.
7,302,074 B2 11/2007 Wagner et al.
D573,588 S 7/2008 Warren et al.
7,406,179 B2 7/2008 Ryan
7,433,481 B2 10/2008 Armstrong et al.
7,477,754 B2 1/2009 Rasmussen et al.
7,477,756 B2 1/2009 Wickstrom et al.
7,502,484 B2 3/2009 Ngia et al.
7,590,254 B2 9/2009 Olsen
7,680,292 B2 3/2010 Warren et al.
7,747,032 B2 6/2010 Zei et al.
7,773,759 B2 8/2010 Alves et al.
7,869,610 B2 1/2011 Jayanth et al.
7,889,881 B2 2/2011 Ostrowski
7,899,194 B2 3/2011 Boesen
7,965,834 B2 6/2011 Alves et al.
7,983,433 B2 7/2011 Nemirovski
8,005,249 B2 8/2011 Wirola et al.
8,019,107 B2 9/2011 Ngia et al.
8,027,481 B2 9/2011 Beard
8,045,724 B2 10/2011 Sibbald
8,072,010 B2 12/2011 Lutz
8,077,873 B2 12/2011 Shridhar et al.
8,081,780 B2 12/2011 Goldstein et al.
8,103,029 B2 1/2012 Ngia et al.
8,111,853 B2 2/2012 Isvan
8,116,489 B2 2/2012 Mejia et al.
8,116,502 B2 2/2012 Saggio, Jr. et al.
8,135,140 B2 3/2012 Shridhar et al.
8,180,067 B2 5/2012 Soulodre
8,189,799 B2 5/2012 Shridhar et al.
8,194,880 B2 6/2012 Avendano
8,199,924 B2 6/2012 Wertz et al.
8,213,643 B2 7/2012 Hemer
8,213,645 B2 7/2012 Rye et al.
8,229,125 B2 7/2012 Short

(56) References Cited

U.S. PATENT DOCUMENTS 8,229,740 B2 7/2012 Nordholm et al.
8,238,567 B2 8/2012 Burge et al.
8,249,287 B2 8/2012 Silvestri et al.
8,254,591 B2 8/2012 Goldstein et al.
8,270,626 B2 9/2012 Shridhar et al.
8,285,344 B2 10/2012 Kahn et al.
8,295,503 B2 10/2012 Sung et al.
8,311,253 B2 11/2012 Silvestri et al.
8,315,404 B2 11/2012 Shridhar et al.
8,325,963 B2 12/2012 Kimura
8,331,604 B2 12/2012 Saito et al.
8,363,823 B1 1/2013 Santos
8,376,967 B2 2/2013 Mersky
8,385,560 B2 2/2013 Solbeck et al.
8,401,200 B2 3/2013 Tisoareno et al.
8,401,215 B2 3/2013 Warren et al.
8,416,979 B2 4/2013 Takai
8,462,956 B2 6/2013 Goldstein et al.
8,473,287 B2 6/2013 Every et al.
8,483,418 B2 7/2013 Platz et al.
8,488,831 B2 7/2013 Saggio, Jr. et al.
8,494,201 B2 7/2013 Anderson
8,498,428 B2 7/2013 Schreuder et al.
8,503,689 B2 8/2013 Schreuder et al.
8,503,704 B2 8/2013 Francart et al.
8,509,465 B2 8/2013 Theverapperuma
8,526,646 B2 9/2013 Boesen
8,532,323 B2 9/2013 Wickstrom et al.
8,553,899 B2 10/2013 Salvelli et al.
8,553,923 B2 10/2013 Tiscareno et al.
8,571,227 B2 10/2013 Donaldson et al.
8,594,353 B2 11/2013 Anderson
8,620,650 B2 12/2013 Walters et al.
8,634,576 B2 1/2014 Salvetti et al.
8,655,003 B2 2/2014 Duisters et al.
8,666,102 B2 3/2014 Bruckhoff et al.
8,681,999 B2 3/2014 Theverapperuma et al.
8,682,001 B2 3/2014 Annunziato et al.
8,705,787 B2 4/2014 Larsen et al.
8,837,746 B2 9/2014 Burnett
8,942,976 B2 1/2015 Li et al.
8,983,083 B2 3/2015 Tiscareno et al.
9,014,382 B2 4/2015 Van De Par et al.
9,025,415 B2 5/2015 Derkx
9,042,588 B2 5/2015 Aase
9,047,855 B2 6/2015 Bakalos
9,078,064 B2 7/2015 Wickstrom et al.
9,100,756 B2 8/2015 Dusan et al.
9,107,008 B2 8/2015 Leitner
9,123,320 B2 9/2015 Carreras et al.
9,154,868 B2 10/2015 Narayan et al.
9,167,337 B2 10/2015 Shin
9,185,487 B2 11/2015 Solbach et al.
9,208,769 B2 12/2015 Azmi
9,226,068 B2 12/2015 Hendrix et al.
9,264,823 B2 2/2016 Bajic et al.
2001/0011026 A1 8/2001 Nishijima
2001/0021659 A1 9/2001 Okamura
2001/0049262 A1 12/2001 Lehtonen
2002/0016188 A1 2/2002 Kashiwamura
2002/0021800 A1 2/2002 Bodley et al.
2002/0038394 A1 3/2002 Liang et al.
2002/0054684 A1 5/2002 Menzl
2002/0056114 A1 5/2002 Fillebrown et al.
2002/0067825 A1 6/2002 Baranowski et al.
2002/0098877 A1 7/2002 Glezerman
2002/0136420 A1 9/2002 Topholm
2002/0159023 A1 10/2002 Swab
2002/0176330 A1 11/2002 Ramonowski et al.
2002/0183089 A1 12/2002 Heller et al.
2003/0002704 A1 1/2003 Pronk
2003/0013411 A1 1/2003 Uchiyama
2003/0017805 A1 1/2003 Yeung et al.
2003/0058808 A1 3/2003 Eaton et al.
2003/0085070 A1 5/2003 Wickstrom
2003/0207703 A1 11/2003 Liou et al.
2003/0223592 A1 12/2003 Deruginsky et al.
2005/0027522 A1 2/2005 Yamamoto et al.
2006/0029234 A1 2/2006 Sargaison
2006/0034472 A1 2/2006 Bazarjani et al.
2006/0153155 A1 7/2006 Jacobsen et al.
2006/0227990 A1 10/2006 Kirchhoefer
2006/0239472 A1 10/2006 Oda
2007/0104340 A1 5/2007 Miller et al.
2007/0147635 A1 6/2007 Dijkstra et al.
2008/0019548 A1 1/2008 Avendano
2008/0063228 A1 3/2008 Mejia et al.
2008/0101640 A1 5/2008 Ballad et al.
2008/0181419 A1 7/2008 Goldstein et al.
2008/0232621 A1 9/2008 Bums
2009/0041269 A1 2/2009 Hemer
2009/0080670 A1 3/2009 Solbeck et al.
2009/0182913 A1 7/2009 Rosenblatt et al.
2009/0207703 A1 8/2009 Matsumoto et al.
2009/0214068 A1 8/2009 Wickstrom
2009/0323982 A1 12/2009 Solbach et al.
2010/0022280 A1* 1/2010 Schrage .................. H04M 1/58 455/567
2010/0081487 A1 4/2010 Chen et al.
2010/0183167 A1 7/2010 Phelps et al.
2010/0233996 A1 9/2010 Herz et al.
2010/0270631 A1 10/2010 Renner
2011/0035213 A1* 2/2011 Malenovsky ........... G10L 25/78 704/208
2011/0257967 A1 10/2011 Every et al.
2012/0008808 A1 1/2012 Saltykov
2012/0056282 A1 3/2012 Van Lippen et al.
2012/0099753 A1 4/2012 van der Avoort et al.
2012/0197638 A1 8/2012 Li et al.
2012/0321103 A1 12/2012 Smailagic et al.
2013/0024194 A1 1/2013 Zhao et al.
2013/0051580 A1 2/2013 Miller
2013/0058495 A1 3/2013 Furst et al.
2013/0070935 A1 3/2013 Hui et al.
2013/0142358 A1 6/2013 Schultz et al.
2013/0272564 A1 10/2013 Miller
2013/0287219 A1 10/2013 Hendrix et al.
2013/0315415 A1 11/2013 Shin
2013/0322642 A1 12/2013 Streitenberger et al.
2013/0343580 A1 12/2013 Lautenschlager et al.
2013/0345842 A1 12/2013 Karakaya et al.
2014/0010378 A1 1/2014 Voix et al.
2014/0044275 A1 2/2014 Goldstein et al.
2014/0086425 A1 3/2014 Jensen et al.
2014/0169579 A1 6/2014 Azmi
2014/0233741 A1 8/2014 Gustavsson
2014/0270231 A1 9/2014 Dusan et al.
2014/0273851 A1 9/2014 Donaldson et al.
2014/0348346 A1 11/2014 Fukuda
2014/0355787 A1 12/2014 Jiles et al.
2015/0025881 A1 1/2015 Carlos et al.
2015/0043741 A1 2/2015 Shin
2015/0055810 A1 2/2015 Shin
2015/0078574 A1 3/2015 Shin
2015/0110280 A1 4/2015 Wardle
2015/0161981 A1 6/2015 Kwatra
2015/0172814 A1* 6/2015 Usher .................... H04R 3/005 381/92
2015/0237448 A1 8/2015 Loeppert
2015/0243271 A1 8/2015 Goldstein
2015/0245129 A1 8/2015 Dusan et al.
2015/0264472 A1 9/2015 Aase
2015/0296305 A1 10/2015 Shao et al.
2015/0296306 A1 10/2015 Shao et al.
2015/0304770 A1 10/2015 Watson et al.
2015/0310846 A1 10/2015 Andersen et al.
2015/0325229 A1 11/2015 Carreras et al.
2015/0325251 A1 11/2015 Dusan et al.
2015/0365770 A1 12/2015 Lautenschlager
2015/0382094 A1 12/2015 Grinker et al.
2016/0007119 A1 1/2016 Harrington
2016/0021480 A1 1/2016 Johnson et al.
2016/0029345 A1 1/2016 Sebeni et al.
2016/0037261 A1 2/2016 Harrington

(56) References Cited

U.S. PATENT DOCUMENTS

| | | | |
|---|---|---|---|
| 2016/0037263 | A1 | 2/2016 | Pal et al. |
| 2016/0042666 | A1 | 2/2016 | Hughes |
| 2016/0044151 | A1 | 2/2016 | Shoemaker et al. |
| 2016/0044398 | A1 | 2/2016 | Siahaan et al. |
| 2016/0044424 | A1 | 2/2016 | Dave et al. |
| 2016/0060101 | A1 | 3/2016 | Loeppert |
| 2016/0105748 | A1 | 4/2016 | Pal et al. |
| 2016/0150335 | A1 | 5/2016 | Outub et al. |
| 2016/0165334 | A1 | 6/2016 | Grossman |
| 2016/0165361 | A1 | 6/2016 | Miller et al. |

FOREIGN PATENT DOCUMENTS

| | | | |
|---|---|---|---|
| CN | 204168483 | U | 2/2015 |
| CN | 204669605 | U | 9/2015 |
| CN | 204681587 | U | 9/2015 |
| CN | 204681593 | U | 9/2015 |
| DE | 915826 | C | 7/1954 |
| DE | 3723275 | A1 | 3/1988 |
| DE | 102009051713 | A1 | 5/2011 |
| DE | 102011003470 | A1 | 8/2012 |
| EP | 0124870 | A2 | 11/1984 |
| EP | 0500985 | A1 | 9/1992 |
| EP | 0684750 | A2 | 11/1995 |
| EP | 0806909 | A1 | 11/1997 |
| EP | 1299988 | A2 | 4/2003 |
| EP | 1310136 | B1 | 3/2006 |
| EP | 1509065 | B1 | 4/2006 |
| EP | 1469701 | B1 | 4/2008 |
| EP | 2434780 | A1 | 3/2012 |
| JP | S5888996 | A | 5/1983 |
| JP | S60103798 | A | 6/1985 |
| JP | 2007150743 | A | 6/2007 |
| JP | 2012169828 | A | 9/2012 |
| JP | 5049312 | B2 | 10/2012 |
| KR | 1020110058769 | A | 6/2011 |
| KR | 101194904 | B1 | 10/2012 |
| KR | 1020140026722 | A | 3/2014 |
| WO | WO1983003733 | A1 | 10/1983 |
| WO | WO1994007342 | A1 | 3/1994 |
| WO | WO1996023443 | A1 | 8/1996 |
| WO | WO2000025551 | A1 | 5/2000 |
| WO | WO2002017835 | A1 | 3/2002 |
| WO | WO2002017836 | A1 | 3/2002 |
| WO | WO2002017837 | A1 | 3/2002 |
| WO | WO2002017838 | A1 | 3/2002 |
| WO | WO2002017839 | A1 | 3/2002 |
| WO | WO2003073790 | A1 | 9/2003 |
| WO | WO2006114767 | A1 | 11/2006 |
| WO | WO2007073818 | A1 | 7/2007 |
| WO | WO2007082579 | A2 | 7/2007 |
| WO | WO2007147416 | A1 | 12/2007 |
| WO | WO2008128173 | A1 | 10/2008 |
| WO | WO2009012491 | A2 | 1/2009 |
| WO | WO2009023784 | A1 | 2/2009 |
| WO | WO2011051469 | A1 | 5/2011 |
| WO | WO2011061483 | A2 | 5/2011 |
| WO | WO2013033001 | A1 | 3/2013 |
| WO | WO2016085814 | A1 | 6/2016 |
| WO | WO2016089671 | A1 | 6/2016 |
| WO | WO2016089745 | A1 | 6/2016 |

OTHER PUBLICATIONS

Final Office Action, dated Jan. 12, 2005, U.S. Appl. No. 10/138,929, filed May 3, 2002.

Non-Final Office Action, dated Jan. 12, 2006, U.S. Appl. No. 10/138,929, filed May 3, 2002.

Notice of Allowance, dated Sep. 27, 2012, U.S. Appl. No. 13/568,989, filed Aug. 7, 2012.

Non-Final Office Action, dated Sep. 23, 2015, U.S. Appl. No. 13/224,068, filed Sep. 1, 2011.

Non-Final Office Action, dated Nov. 4, 2015, U.S. Appl. No. 14/853,947, filed Sep. 14, 2015.

Notice of Allowance, dated Mar. 21, 2016, U.S. Appl. No. 14/853,947, filed Sep. 14, 2015.

Final Office Action, dated May 12, 2016, U.S. Appl. No. 13/224,068, filed Sep. 1, 2011.

Ephraim, Y. et al., "Speech enhancement using a minimum mean-square error short-time spectral amplitude estimator," IEEE Transactions on Acoustics, Speech, and Signal Processing, vol. ASSP-32, No. 6, Dec. 1984, pp. 1109-1121.

Sun et al., "Robust Noise Estimation Using Minimum Correction with Harmonicity Control." Conference: Interspeech 2010, 11th Annual Conference of the International Speech Communication Association, Makuhari, Chiba, Japan, Sep. 26-30, 2010. p. 1085-1088.

Lomas, "Apple Patents Earbuds With Noise-Canceling Sensor Smarts," Aug. 27, 2015. [retrieved on Sep. 16, 2015]. TechCrunch. Retrieved from the Internet: <URL: http://techcrunch.com/2015/08/27/apple-wireless-earbuds-at-last/>. 2 pages.

Smith, Gina, "New Apple Patent Applications: The Sound of Hearables to Come," aNewDomain, Feb. 12, 2016, accessed Mar. 2, 2016 at URL: <http://anewdomain.net/2016/02/12/new-apple-patent-applications-glimpse-hearables-come/>, 30 pages.

Qutub, Sarmad et al., "Acoustic Apparatus with Dual MEMS Devices," U.S. Appl. No. 14/872,887, filed Oct. 1, 2015, 24 pages.

Office Action dated Feb. 4, 2016 in U.S. Appl. No. 14/318,436, filed Jun. 27, 2014, 10 pages.

Office Action dated Jan. 22, 2016 in U.S. Appl. No. 14/774,666, filed Sep. 10, 2015, 14 pages.

Hegde, Nagaraj, "Seamlessly Interfacing MEMS Microphones with Blacktin™ Processors", EE350 Analog Devices, Rev. 1, Aug. 2010, pp. 1-10.

Office Action dated May 21, 2015 in Korean Patent Application No. 10-2014-7008553, 2 pages.

International Search Report and Written Opinion dated Jan. 21, 2013 in Patent Cooperation Treaty Application No. PCT/US2012/052478, filed Aug. 27, 2012, 7 pages.

*Duplan Corporaton* vs. *Deering Milliken*, 444 F. Supp. 648, 197 USPQ 342 (D.S.C. 1977), 128 pages.

Combined Bluetooth Headset and USB Dongle, Advance Information, RTX Telecom A/S, vol. 1, Apr. 6, 2002, 1 page.

Langberg, Mike, "Bluelooth Sharpens Its Connections," Chicago Tribune, Apr. 29, 2002, Business Section, p. 3, accessed Mar. 11, 2016 at URL: <http://articles.chicagotribune.com/2002-04-29/business/0204290116_1_bluetooth-enabled-bluetooth-headset-bluetooth-devices>, 6 pages.

Yen, Kuan-Chieh et al., "Audio Monitoring and Adaptation Using Headset Microphones Inside User's Ear Canal", U.S. Appl. No. 14/985,187, filed Dec. 30, 2015, 27 pages.

Gadonniex, Sharon et al., "Occlusion Reduction and Active Noise Reduction Based on Seal Quality", U.S. Appl. No. 14/985,057, filed Dec. 30, 2015, 25 pages.

Miller, Thomas E. et al., "Voice-Enhanced Awareness Mode", U.S. Appl. No. 14/985,112, filed Dec. 30, 2015, 27 pages.

Verma, Tony, "Context Aware False Acceptance Rate Reduction", U.S. Appl. No. 14/749,425, filed Jun. 24, 2015, 28 pages.

International Search Report and Written Opinion for Patent Cooperation Treaty Application No. PCT/US2015/062940 dated Mar. 28, 2016 (10 pages).

International Search Report and Written Opinion for Patent Cooperation Treaty Application No. PCT/US2015/062393 dated Apr. 8, 2016 (9 pages).

International Search Report and Written Opinion for Patent Cooperation Treaty Application No. PCT/US2015/061871 dated Mar. 29, 2016 (9 pages).

* cited by examiner

MICROPHONE SIGNAL FUSION

CROSS-REFERENCE TO RELATED APPLICATION

The present application is a Continuation of U.S. patent application Ser. No. 14/853,947, filed Sep. 14, 2015, which is hereby incorporated by reference herein in its entirety including all references cited therein.

FIELD

The present application relates generally to audio processing and, more specifically, to systems and methods for fusion of microphone signals.

BACKGROUND

The proliferation of smart phones, tablets, and other mobile devices has fundamentally changed the way people access information and communicate. People now make phone calls in diverse places such as crowded bars, busy city streets, and windy outdoors, where adverse acoustic conditions pose severe challenges to the quality of voice communication. Additionally, voice commands have become an important method for interaction with electronic devices in applications where users have to keep their eyes and hands on the primary task, such as, for example, driving. As electronic devices become increasingly compact, voice command may become the preferred method of interaction with electronic devices. However, despite recent advances in speech technology, recognizing voice in noisy conditions remains difficult. Therefore, mitigating the impact of noise is important to both the quality of voice communication and performance of voice recognition.

Headsets have been a natural extension of telephony terminals and music players as they provide hands-free convenience and privacy when used. Compared to other hands-free options, a headset represents an option in which microphones can be placed at locations near the user's mouth, with constrained geometry among user's mouth and microphones. This results in microphone signals that have better signal-to-noise ratios (SNRs) and are simpler to control when applying multi-microphone based noise reduction. However, when compared to traditional handset usage, headset microphones are relatively remote from the user's mouth. As a result, the headset does not provide the noise shielding effect provided by the user's hand and the bulk of the handset. As headsets have become smaller and lighter in recent years due to the demand for headsets to be subtle and out-of-way, this problem becomes even more challenging.

When a user wears a headset, the user's ear canals are naturally shielded from outside acoustic environment. If a headset provides tight acoustic sealing to the ear canal, a microphone placed inside the ear canal (the internal microphone) would be acoustically isolated from outside environment such that environmental noise would be significantly attenuated. Additionally, a microphone inside a sealed ear canal is free of wind-buffeting effect. On the other hand, a user's voice can be conducted through various tissues in user's head to reach the ear canal, because it is trapped inside of the ear canal. A signal picked up by the internal microphone should thus have much higher SNR compared to the microphone outside of the user's ear canal (the external microphone).

Internal microphone signals are not free of issues, however. First of all, the body-conducted voice tends to have its high-frequency content severely attenuated and thus has much narrower effective bandwidth compared to voice conducted through air. Furthermore, when the body-conducted voice is sealed inside an ear canal, it forms standing waves inside the ear canal. As a result, the voice picked up by the internal microphone often sounds muffled and reverberant while lacking the natural timbre of the voice picked up by the external microphones. Moreover, effective bandwidth and standing-wave patterns vary significantly across different users and headset fitting conditions. Finally, if a loudspeaker is also located in the same ear canal, sounds made by the loudspeaker would also be picked by the internal microphone. Even with acoustic echo cancellation (AEC), the close coupling between the loudspeaker and internal microphone often leads to severe voice distortion after AEC.

Other efforts have been attempted in the past to take advantage of the unique characteristics of the internal microphone signal for superior noise reduction performance. However, attaining consistent performance across different users and different usage conditions has remained challenging.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one aspect of the described technology, an example method for fusion of microphone signals is provided. In various embodiments, the method includes receiving a first signal and a second signal. The first signal includes at least a voice component. The second signal includes the voice component modified by at least a human tissue. The method also includes processing the first signal to obtain first noise estimates. The method further includes aligning the second signal with the first signal. Blending, based at least on the first noise estimates, the first signal and the aligned second signal to generate an enhanced voice signal is also included in the method. In some embodiments, the method includes processing the second signal to obtain second noise estimates and the blending is based at least on the first noise estimates and the second noise estimates.

In some embodiments, the second signal represents at least one sound captured by an internal microphone located inside an ear canal. In certain embodiments, the internal microphone may be sealed during use for providing isolation from acoustic signals coming outside the ear canal, or it may be partially sealed depending on the user and the user's placement of the internal microphone in the ear canal.

In some embodiments, the first signal represents at least one sound captured by an external microphone located outside an ear canal.

In some embodiments, the method further includes performing noise reduction of the first signal based on the first noise estimates before aligning the signals. In other embodiments, the method further includes performing noise reduction of the first signal based on the first noise estimates and noise reduction of the second signal based on the second noise estimates before aligning the signals.

According to another aspect of the present disclosure, a system for fusion of microphone signals is provided. The example system includes a digital signal processor configured to receive a first signal and a second signal. The first signal includes at least a voice component. The second signal includes at least the voice component modified by at least a human tissue. The digital signal processor is operable to process the first signal to obtain first noise estimates and in some embodiments, to process the second signal to obtain second noise estimates. In the example system, the digital signal processor aligns the second signal with the first signal and blends, based at least on the first noise estimates, the first signal and the aligned second signal to generate an enhanced voice signal. In some embodiments, the digital signal processor aligns the second signal with the first signal and blends, based at least on the first noise estimates and the second noise estimates, the first signal and the aligned second signal to generate an enhanced voice signal.

In some embodiments, the system includes an internal microphone and an external microphone. In certain embodiments, the internal microphone may be sealed during use for providing isolation from acoustic signals coming outside the ear canal, or it may be partially sealed depending on the user and the user's placement of the internal microphone in the ear canal. The second signal may represent at least one sound captured by the internal microphone. The external microphone is located outside the ear canal. The first signal may represent at least one sound captured by the external microphone.

According to another example, embodiments of the present disclosure, the steps of the method for fusion of microphone signals are stored on a non-transitory machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The technology disclosed herein relates to systems and methods for fusion of microphone signals. Various embodiments of the present technology may be practiced with mobile devices configured to receive and/or provide audio to other devices such as, for example, cellular phones, phone handsets, headsets, wearables, and conferencing systems.

Various embodiments of the present disclosure provide seamless fusion of at least one internal microphone signal and at least one external microphone signal utilizing the contrasting characteristics of the two signals for achieving an optimal balance between noise reduction and voice quality.

According to an example embodiment, a method for fusion of microphone signals may commence with receiving a first signal and a second signal. The first signal includes at least a voice component. The second signal includes the voice component modified by at least a human tissue. The example method provides for processing the first signal to obtain first noise estimates and in some embodiments, processing the second signal to obtain second noise estimates. The method may include aligning the second signal with the first signal. The method can provide blending, based at least on the first noise estimates (and in some embodiments, also based on the second noise estimates), the first signal and the aligned second signal to generate an enhanced voice signal.

Figure 1:
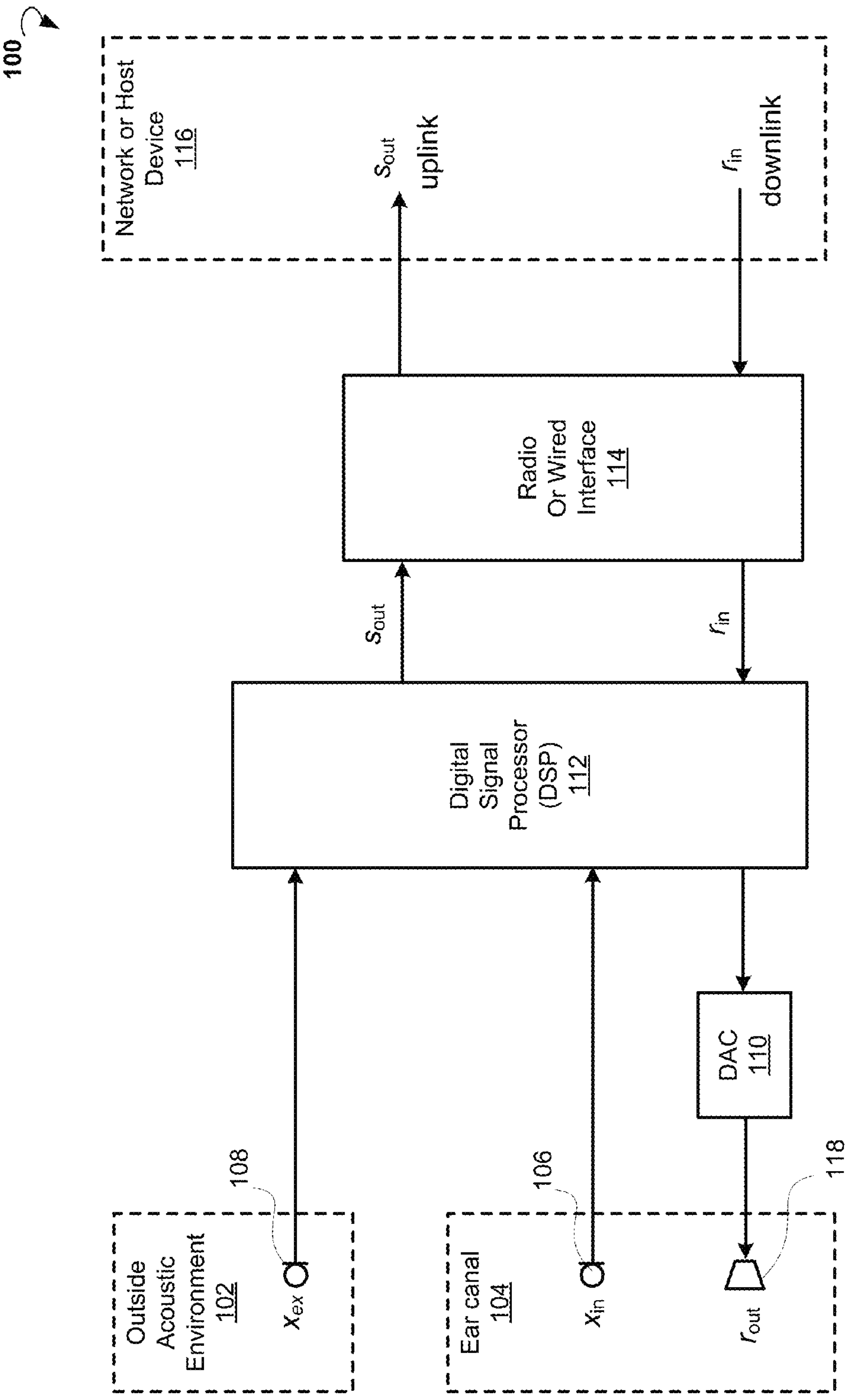
FIG. 1 is a block diagram of a system and an environment in which the system is used, according to an example embodiment.

Referring now to FIG. 1, a block diagram of an example system 100 for fusion of microphone signals and environment thereof is shown. The example system 100 includes at least an internal microphone 106, an external microphone 108, a digital signal processor (DSP) 112, and a radio or wired interface 114. The internal microphone 106 is located inside a user's ear canal 104 and is relatively shielded from the outside acoustic environment 102. The external microphone 108 is located outside of the user's ear canal 104 and is exposed to the outside acoustic environment 102.

In various embodiments, the microphones 106 and 108 are either analog or digital. In either case, the outputs from the microphones are converted into synchronized pulse coded modulation (PCM) format at a suitable sampling frequency and connected to the input port of the DSP 112. The signals $x_{in}$ and $x_{ex}$ denote signals representing sounds captured by the internal microphone 106 and external microphone 108, respectively.

The DSP 112 performs appropriate signal processing tasks to improve the quality of microphone signals $x_{in}$ and $x_{ex}$. The output of DSP 112, referred to as the send-out signal ($s_{out}$), is transmitted to the desired destination, for example, to a network or host device 116 (see signal identified as $s_{out}$ uplink), through a radio or wired interface 114.

If a two-way voice communication is needed, a signal is received by the network or host device 116 from a suitable source (e.g., via the radio or wired interface 114). This is referred to as the receive-in signal ($r_{in}$) (identified as $r_{in}$ downlink at the network or host device 116). The receive-in signal can be coupled via the radio or wired interface 114 to the DSP 112 for necessary processing. The resulting signal, referred to as the receive-out signal ($r_{out}$), is converted into an analog signal through a digital-to-analog convertor (DAC) 110 and then connected to a loudspeaker 118 in order to be presented to the user. In some embodiments, the loudspeaker 118 is located in the same ear canal 104 as the internal microphone 106. In other embodiments, the loudspeaker 118 is located in the ear canal opposite to the ear canal 104. In example of FIG. 1, the loudspeaker 118 is found in the same ear canal as the internal microphone 106, therefore, an acoustic echo canceller (AEC) can be needed to prevent the feedback of the received signal to the other end. Optionally, in some embodiments, if no further processing on the received signal is necessary, the receive-in signal ($r_{in}$) can be coupled to the loudspeaker without going through the DSP 112.

Figure 2:
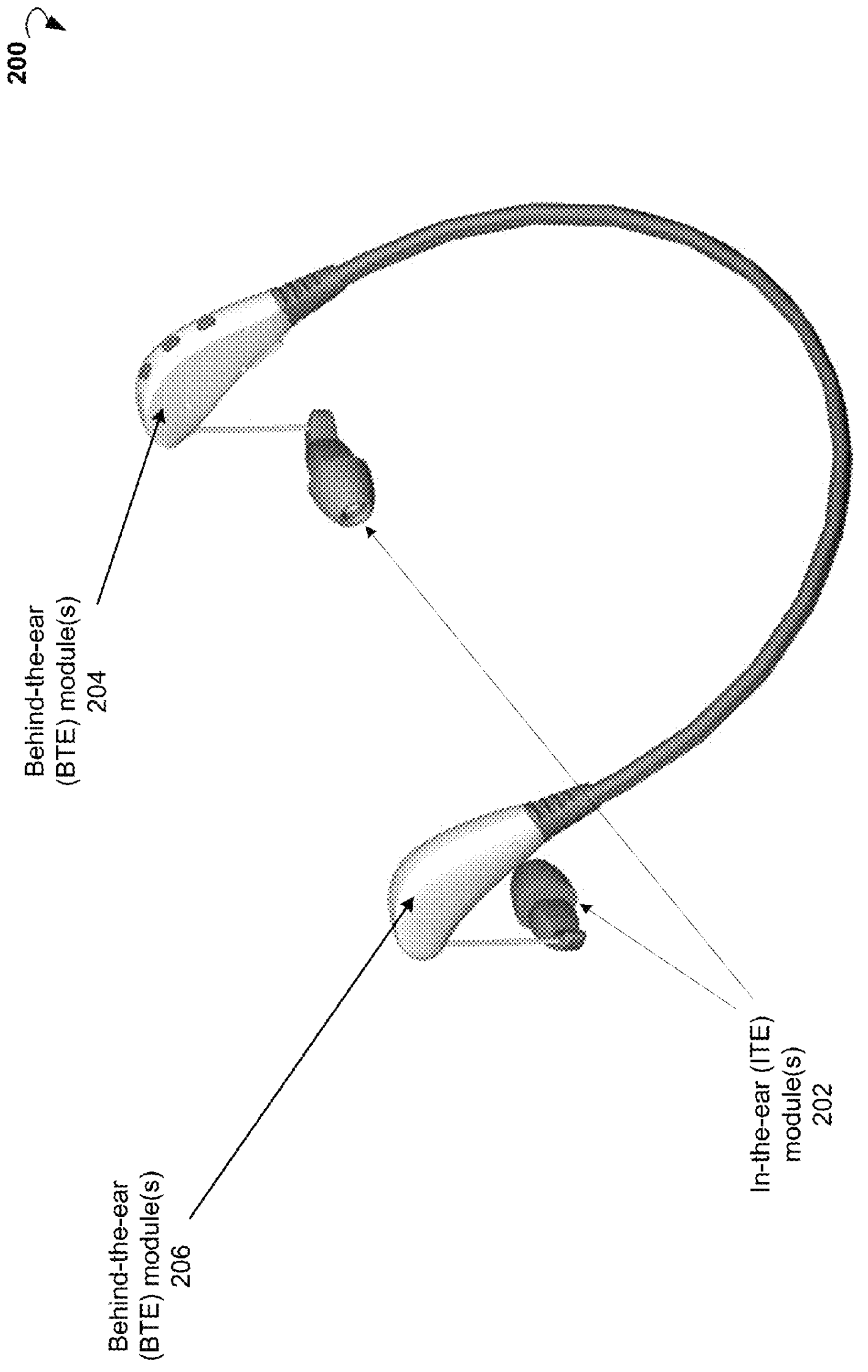
FIG. 2 is a block diagram of a headset suitable for implementing the present technology, according to an example embodiment.

FIG. 2 shows an example headset 200 suitable for implementing methods of the present disclosure. The headset 200 includes example inside-the-ear (ITE) module(s) 202 and behind-the-ear (BTE) modules 204 and 206 for each ear of a user. The ITE module(s) 202 are configured to be inserted into the user's ear canals. The BTE modules 204 and 206 are configured to be placed behind the user's ears. In some embodiments, the headset 200 communicates with host devices through a Bluetooth radio link. The Bluetooth radio link may conform to a Bluetooth Low Energy (BLE) or other Bluetooth standard and may be variously encrypted for privacy.

In various embodiments, ITE module(s) 202 includes internal microphone 106 and the loudspeaker 118, both facing inward with respect to the ear canal. The ITE module(s) 202 can provide acoustic isolation between the ear canal(s) 104 and the outside acoustic environment 102.

In some embodiments, each of the BTE modules 204 and 206 includes at least one external microphone. The BTE module 204 may include a DSP, control button(s), and Bluetooth radio link to host devices. The BTE module 206 can include a suitable battery with charging circuitry.

Characteristics of Microphone Signals

The external microphone 108 is exposed to the outside acoustic environment. The user's voice is transmitted to the external microphone 108 through the air. When the external microphone 108 is placed reasonably close to the user's mouth and free of obstruction, the voice picked up by the external microphone 108 sounds natural. However, in various embodiments, the external microphone 108 is exposed to environmental noises such as noise generated by wind, cars, and babble background speech. When present, environmental noise reduces the quality of the external microphone signal and can make voice communication and recognition difficult.

The internal microphone 106 is located inside the user's ear canal. When the ITE module(s) 202 provides good acoustic isolation from outside environment (e.g., providing a good seal), the user's voice is transmitted to the internal microphone 106 mainly through body conduction. Due to the anatomy of human body, the high-frequency content of the body-conducted voice is severely attenuated compared to the low-frequency content and often falls below a predetermined noise floor. Therefore, the voice picked up by the internal microphone 106 can sound muffled. The degree of muffling and frequency response perceived by a user can depend on the particular user's bone structure, particular configuration of the user's Eustachian tube (that connects the middle ear to the upper throat) and other related user anatomy. On the other hand, the internal microphone 106 is relatively free of the impact from environment noise due to the acoustic isolation.

Figure 3:
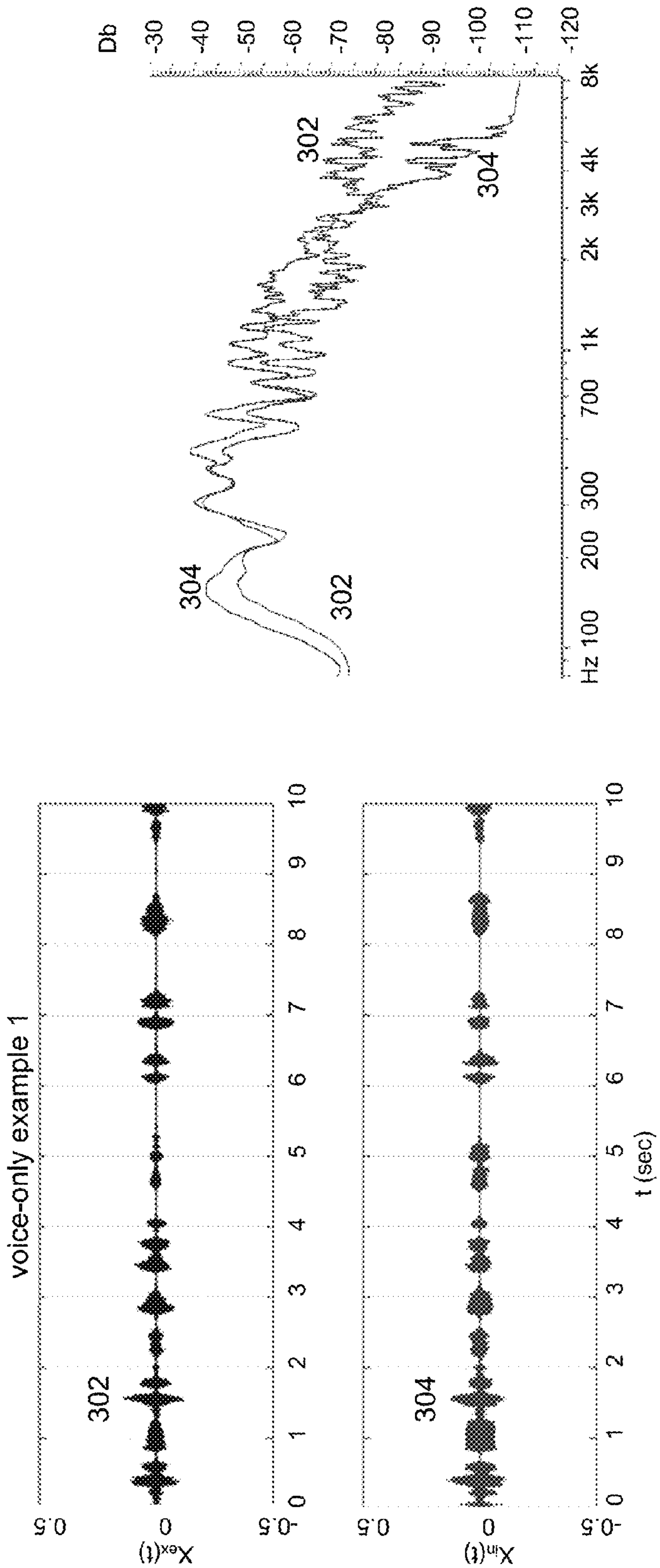
FIGS. 3-5 are examples of waveforms and spectral distributions of signals captured by an external microphone and an internal microphone.

FIG. 3 shows an example of waveforms and spectral distributions of signals 302 and 304 captured by the external microphone 108 and the internal microphone 106, respectively. The signals 302 and 304 include the user's voice. As illustrated in this example, the voice picked up by the internal microphone 106 has a much stronger spectral tilt toward the lower frequency. The higher-frequency content of signal 304 in the example waveforms is severely attenuated and thus results in a much narrower effective bandwidth compared to signal 302 picked up by the external microphone.

Figure 4:
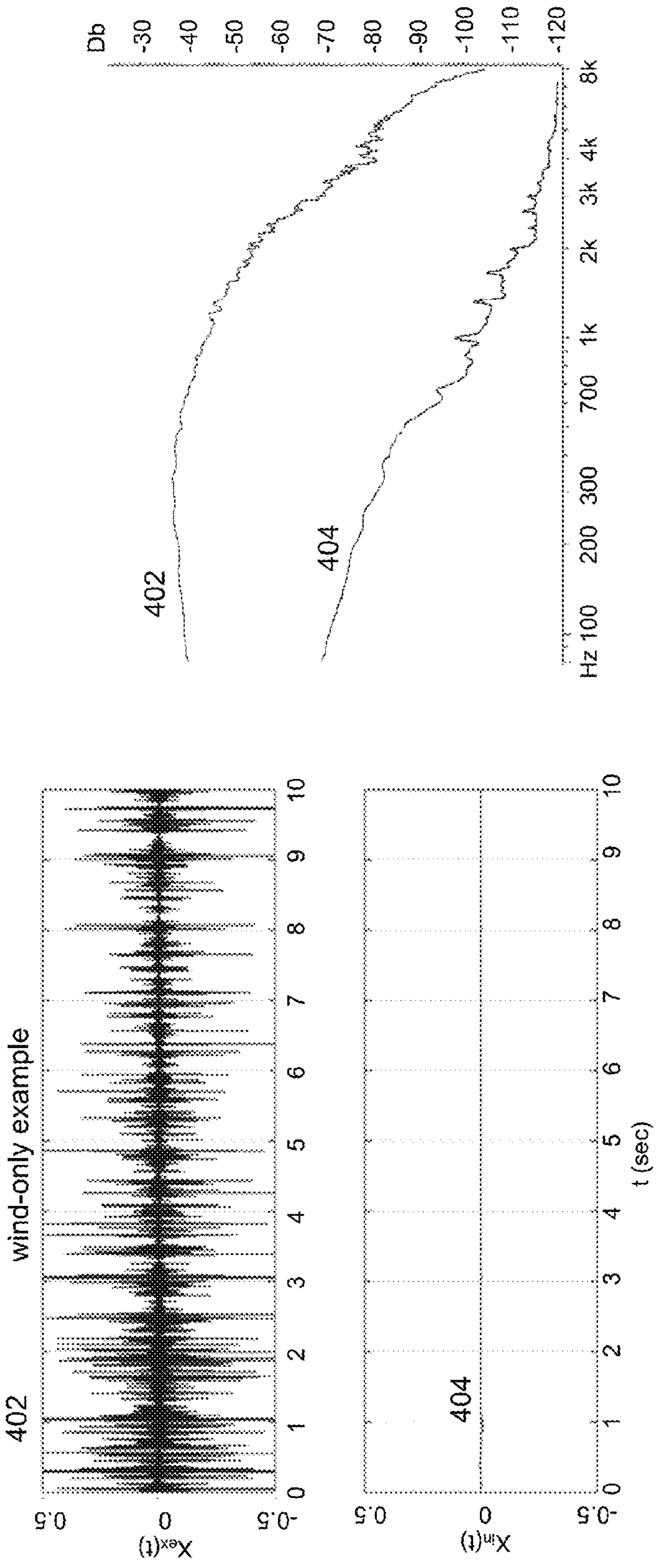

FIG. 4 shows another example of the waveforms and spectral distributions of signals 402 and 404 captured by external microphone 108 and internal microphone 106, respectively. The signals 402 and 404 include only wind noise in this example. The substantial difference in the signals 402 and 404 indicate that wind noise is evidently present at the external microphone 108 but is largely shielded from the internal microphone 106 in this example.

The effective bandwidth and spectral balance of the voice picked by the internal microphone 106 may vary significantly, depending on factors such as the anatomy of user's head, user's voice characteristics, and acoustic isolation provided by the ITE module(s) 202. Even with exactly the same user and headset, the condition can change significantly between wears. One of the most significant variables is the acoustic isolation provided by the ITE module(s) 202. When the sealing of the ITE module(s) 202 is tight, user's voice reaches internal microphone mainly through body conduction and its energy is well retained inside the ear canal. Since due to the tight sealing the environment noise is largely blocked from entering the ear canal, the signal at the internal microphone has very high signal-to-noise ratio (SNR) but often with very limited effective bandwidth. When the acoustic leakage between outside environment and ear canal becomes significant (e.g., due to partial sealing of the ITE module(s) 202), the user's voice can reach the internal microphone also through air conduction, thus the effective bandwidth improves. However, as the environment noise enters the ear canal and body-conducted voice escapes out of ear canal, the SNR at the internal microphone 106 can also decrease.

Figure 5:
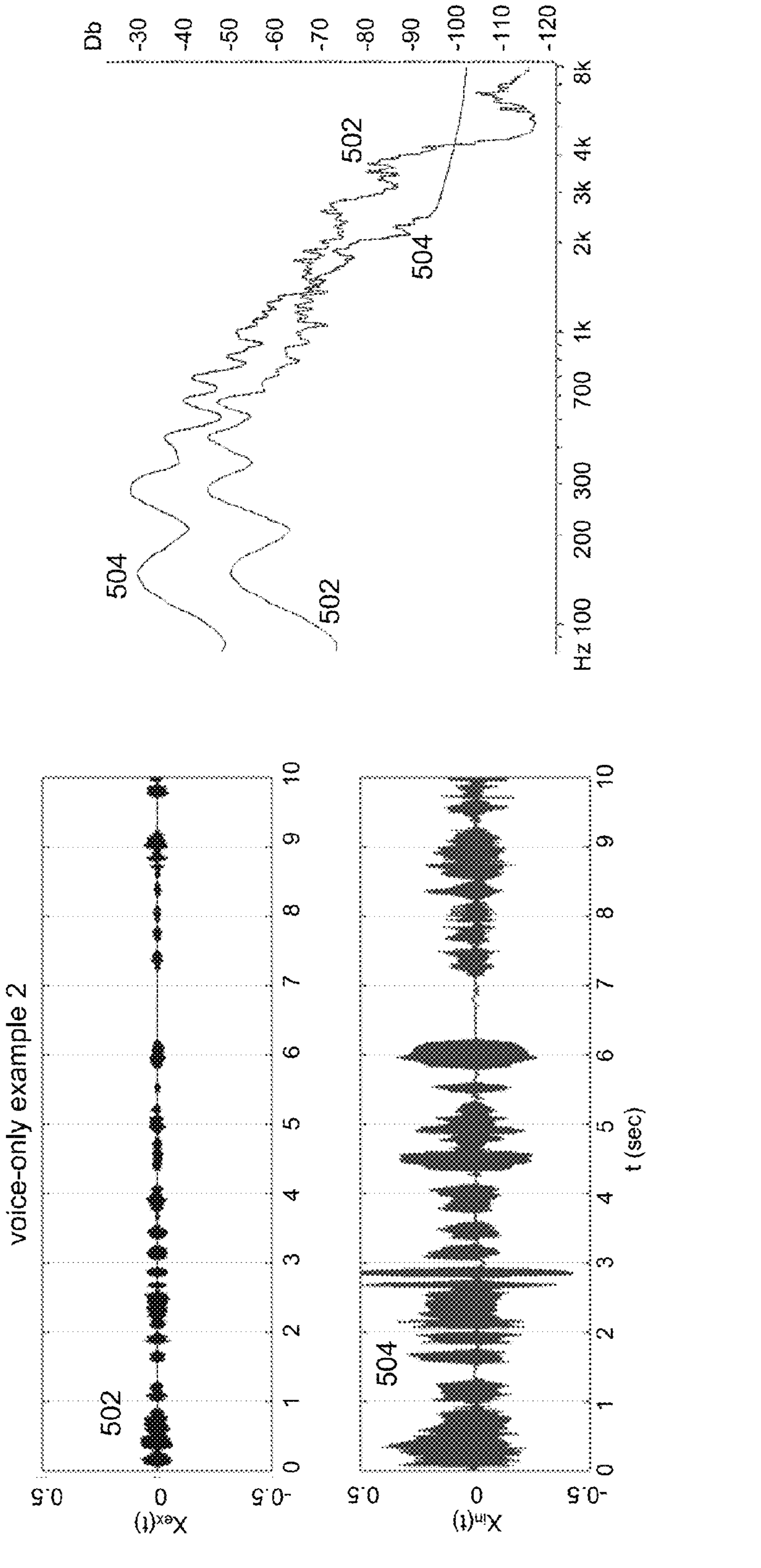

FIG. 5 shows yet another example of the waveforms and spectral distributions of signals 502 and 504 captured by external microphone 108 and internal microphone 106, respectively. The signals 502 and 504 include the user's voice. The internal microphone signal 504 in FIG. 5 has stronger lower-frequency content than the internal microphone signal 304 of FIG. 3, but has a very strong roll-off after 2.0-2.5 kHz. In contrast, the internal microphone signal 304 in FIG. 3 has a lower level, but has significant voice content up to 4.0-4.5 kHz in this example.

Figure 6:
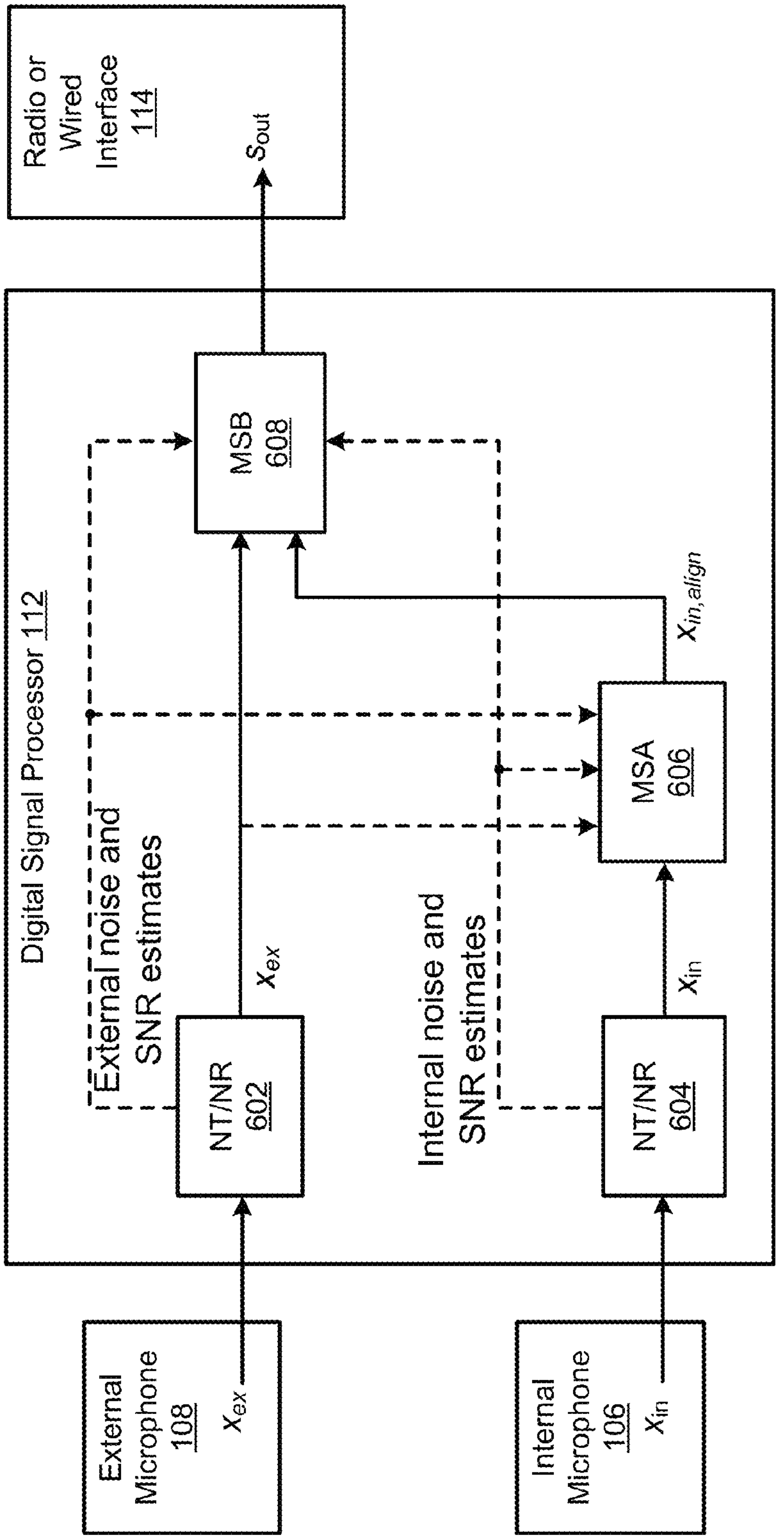
FIG. 6 is a block diagram illustrating details of a digital processing unit for fusion of microphone signals, according to an example embodiment.

FIG. 6 illustrates a block diagram of DSP 112 suitable for fusion of microphone signals, according to various embodiments of the present disclosure. The signals $x_{in}$ and $x_{ex}$ are signals representing sounds captured from, respectively, the internal microphone 106 and external microphone 108. The signals $x_{in}$ and $x_{ex}$ need not be the signals directly from the respective microphones; they may represent the signals that are directly from the respective microphones. For example, the direct signal outputs from the microphones may be preprocessed in some way, for example, conversion into synchronized pulse coded modulation (PCM) format at a suitable sampling frequency, with the converted signal being the signals processed by the method.

In the example in FIG. 6, the signals $x_{in}$ and $x_{ex}$ are first processed by a noise tracking/noise reduction (NT/NR) modules 602 and 604 to obtain running estimate of the noise level picked up at each microphone. Optionally, noise reduction (NR) can be performed by NT/NR modules 602 and 604 by utilizing the estimated noise level. In various embodiments, the microphone signals $x_{in}$ and $x_{ex}$, with or without NR, and noise estimates (e.g., "external noise and SNR estimates" output from NT/NR 602 and/or "internal noise and SNR estimates" output from NT/NR 604) from the NT/NR modules 602 and 604 are sent to a microphone spectral alignment (MSA) module 606, where a spectral alignment filter is adaptively estimated and applied to the internal microphone signal $x_{in}$. A primary purpose of MSA is to spectrally align the voice picked up at the internal microphone 106 to the voice picked up at the external microphone 108 within the effective bandwidth of the in-canal voice signal.

The external microphone signal $x_{ex}$, the spectrally-aligned internal microphone signal $x_{in,align}$, and the estimated noise levels at both microphones 106 and 108 are then sent to a microphone signal blending (MSB) module 608, where the two microphone signals are intelligently combined based on the current signal and noise conditions to form a single output with optimal voice quality.

Further details regarding the modules in FIG. 6 are set forth variously below.

In various embodiments, the modules 602-608 (NT/NR, MSA, and MSB) operate in a fullband domain (a time domain) or a certain subband domain (frequency domain). For embodiments having a module operating in a subband domain, a suitable analysis filterbank (AFB) is applied, for the input to the module, to convert each time-domain input signal into the subband domain. A matching synthesis filterbank (SFB) is provided in some embodiments, to convert each subband output signal back to the time domain as needed depending on the domain of the receiving module.

Examples of the filterbanks include Digital Fourier Transform (DFT) filterbank, Modified Digital Cosine Transform (MDCT) filterbank, ⅓-Octave filterbank, Wavelet filterbank, or other suitable perceptually inspired filterbanks. If consecutive modules 602-608 operate in the same subband domain, the intermediate AFBs and SFBs may be removed for maximum efficiency and minimum system latency. Even if two consecutive modules 602-608 operate in different subband domains in some embodiments, their synergy can be utilized by combining the SFB of the earlier module and the AFB of the later module for minimized latency and computation. In various embodiments, all processing modules 602-608 operate in the same subband domain.

Before the microphone signals reach any of the modules 602-608, they may be processed by suitable pre-processing modules such as direct current (DC)-blocking filters, wind buffeting mitigation (WBM), AEC, and the like. Similarly, the output from the MSB module 608 can be further processed by suitable post-processing modules such as static or dynamic equalization (EQ) and automatic gain control (AGC). Furthermore, other processing modules can be inserted into the processing flow shown in FIG. 6, as long as the inserted modules do not interfere with the operation of various embodiments of the present technology.

Further Details of the Processing Modules

Noise Tracking/Noise Reduction (NT/NR) Module

The primary purpose of the NT/NR modules 602 and 604 is to obtain running noise estimates (noise level and SNR) in the microphone signals. These running estimates are further provided to subsequent modules to facilitate their operations. Normally, noise tracking is more effective when it is performed in a subband domain with sufficient frequency resolution. For example, when a DFT filterbank is used, the DFT sizes of 128 and 256 are preferred for sampling rates of 8 and 16 kHz, respectively. This results in 62.5 Hz/band, which satisfies the requirement for lower frequency bands (<750 Hz). Frequency resolution can be reduced for frequency bands above 1 kHz. For these higher frequency bands, the required frequency resolution may be substantially proportional to the center frequency of the band.

In various embodiments, a subband noise level with sufficient frequency resolution provides richer information with regards to noise. Because different types of noise may have very different spectral distribution, noise with the same fullband level can have very different perceptual impact. Subband SNR is also more resilient to equalization performed on the signal, so subband SNR of an internal microphone signal estimated, in accordance with the present technology, remains valid after the spectral alignment performed by the subsequent MSA module.

Many noise reduction methods are based on effective tracking of noise level and thus may be leveraged for the NT/NR module. Noise reduction performed at this stage can improve the quality of microphone signals going into subsequent modules. In some embodiments, the estimates obtained at the NT/NR modules are combined with information obtained in other modules to perform noise reduction at a later stage. By way of example and not limitation, suitable noise reduction methods is described by Ephraim and Malah, "*Speech Enhancement Using a Minimum Mean-Square Error Short-Time Spectral Amplitude Estimator*," IEEE Transactions on Acoustics, Speech, and Signal Processing, December 1984., which is incorporated herein by reference in its entirety for the above purposes.

Microphone Spectral Alignment (MSA) Module

In various embodiments, the primary purpose of the MSA module 606 is to spectrally align voice signals picked up by the internal and external microphones in order to provide signals for the seamlessly blending of the two voice signals at the subsequent MSB module 608. As discussed above, the voice picked up by the external microphone 108 is typically more spectrally balanced and thus more naturally-sounding. On the other hand, the voice picked up by the internal microphone 106 can tend to lose high-frequency content. Therefore, the MSA module 606, in the example in FIG. 6, functions to spectrally align the voice at internal microphone 106 to the voice at external microphone 108 within the effective bandwidth of the internal microphone voice. Although the alignment of spectral amplitude is the primary concern in various embodiments, the alignment of spectral phase is also a concern to achieve optimal results. Conceptually, microphone spectral alignment (MSA) can be achieved by applying a spectral alignment filter ($H_{SA}$) to the internal microphone signal:

$$X_{in,align}=(f)=H_{SA}(f)X_{in}(f) \quad (1)$$

where $X_{in}(f)$ and $X_{in,align}(f)$ are the frequency responses of the original and spectrally-aligned internal microphone signals, respectively. The spectral alignment filter, in this example, needs to satisfy the following criterion:

$$H_{SA}(f) = \begin{cases} \frac{X_{ex,voice}(f)}{X_{in,voice}(f)}, & f \in \Omega_{in,voice} \\ \delta, & f \notin \Omega_{in,voice} \end{cases} \quad (2)$$

where $\Omega_{in,voice}$ is the effective bandwidth of the voice in the ear canal, $X_{ex,voice}(f)$ and $X_{in,voice}(f)$ are the frequency responses of the voice signals picked up by the external and internal microphones, respectively. In various embodiments, the exact value of δ is equation (2) is not critical, however, it should be a relatively small number to avoid amplifying the noise in the ear canal. The spectral alignment filter can be implemented in either the time domain or any subband domain. Depending on the physical location of the external microphone, addition of a suitable delay to the external microphone signal might be necessary to guarantee the causality of the required spectral alignment filter.

An intuitive method of obtaining a spectral alignment filter is to measure the spectral distributions of voice at external microphone and internal microphone and to construct a filter based on these measurements. This intuitive method could work fine in well-controlled scenarios. However, as discussed above, the spectral distribution of voice and noise in the ear canal is highly variable and dependent on factors specific to users, devices, and how well the device fits into the user's ear on a particular occasion (e.g., the sealing). Designing the alignment filter based on the average of all conditions would only work well under certain conditions. On the other hand, designing the filter based on a specific condition risks overfitting, which might leads to excessive distortion and noise artifacts. Thus, different design approaches are needed to achieve the desired balance.

Clustering Method

In various embodiments, voice signals picked up by external and internal microphones are collected to cover a diverse set of users, devices, and fitting conditions. An empirical spectral alignment filter can be estimated from each of these voice signal pairs. Heuristic or data-driven approaches may then be used to assign these empirical filters into clusters and to train a representative filter for each cluster. Collectively, the representative filters from all clusters form a set of candidate filters, in various embodiments. During the run-time operation, a rough estimate on the desired spectral alignment filter response can be obtained and used to select the most suitable candidate filter to be applied to the internal microphone signal.

Alternatively, in other embodiments, a set of features is extracted from the collected voice signal pairs along with the empirical filters. These features should be more observable and correlate to variability of the ideal response of spectral alignment filter, such as the fundamental frequency of the voice, spectral slope of the internal microphone voice, volume of the voice, and SNR inside of ear canal. In some embodiments, these features are added into the clustering process such that a representative filter and a representative feature vector is trained for each cluster. During the run-time operation, the same feature set may be extracted and compared to these representative feature vectors to find the closest match. In various embodiments, the candidate filter that is from the same cluster as the closest-matched feature vector is then applied to the internal microphone signal.

By way of example and not limitation, an example cluster tracker method is described in U.S. patent application Ser. No. 13/492,780, entitled "Noise Reduction Using Multi-Feature Cluster Tracker," (issued Apr. 14, 2015 as U.S. Pat. No. 9,008,329), which is incorporated herein by reference in its entirety for the above purposes.

Adaptive Method

Other than selecting from a set of pre-trained candidates, adaptive filtering approach can be applied to estimate the spectral alignment filter from the external and internal microphone signals. Because the voice components at the microphones are not directly observable and the effective bandwidth of the voice in the ear canal is uncertain, the criterion stated in Eq. (2) is modified for practical purpose as:

$$\hat{H}_{SA}(f) = \frac{E\{X_{ex}(f)X_{in}^*(f)\}}{E\{|X_{in}(f)|^2\}} \quad (3)$$

where superscript * represents complex conjugate and E{•} represents a statistical expectation. If the ear canal is effectively shielded from outside acoustic environment, the voice signal would be the only contributor to the cross-correlation term at the numerator in Eq. (3) and the auto-correlation term at the denominator in Eq. (3) would be the power of voice at the internal microphone within its effective bandwidth. Outside of its effective bandwidth, the denominator term would be the power of noise floor at the internal microphone and the numerator term would approach 0. It can be shown that the filter estimated based on Eq. (3) is the minimum mean-squared error (MMSE) estimator of the criterion stated in Eq. (2).

When the acoustic leakage between the outside environment and the ear canal becomes significant, the filter estimated based on Eq. (3) is no longer an MMSE estimator of Eq. (2) because the noise leaked into the ear canal also contributes to the cross-correlation between the microphone signals. As a result, the estimator in Eq. (3) would have bi-modal distribution, with the mode associated with voice representing the unbiased estimator and the mode associated with noise contributing to the bias. Minimizing the impact of acoustic leakage can require proper adaptation control. Example embodiments for providing this proper adaptation control are described in further detail below.

Time-Domain Implementations

In some embodiments, the spectral alignment filter defined in Eq. (3) can be converted into time-domain representation as follows:

$$h_{SA}=E\{x_{in}^*(n)x_{in}^T(n)\}^{-1}E\{x_{in}^*(n)x_{ex}(n)\} \quad (4)$$

where $h_{SA}$ is a vector consisting of the coefficients of a length-N finite impulse response (FIR) filter:

$$h_{SA}=[h_{SA}(0)h_{SA}(1)\ldots h_{SA}(N-1)]^T \quad (5)$$

and $x_{ex}(n)$ and $x_{in}(n)$ are signal vectors consisting of the latest N samples of the corresponding signals at time n:

$$x(n)=[x(n)x(n-1)\ldots x(n-N+1)]^T \quad (6)$$

where the superscript $^T$ represents a vector or matrix transpose. The spectrally-aligned internal microphone signal can be obtained by applying the spectral alignment filter to the internal microphone signal:

$$x_{in,align}(n)=x_{in}^T(n)h_{SA}. \quad (7)$$

In various embodiments, many adaptive filtering approaches can be adopted to implement the filter defined in Eq. (4). One such approach is:

$$\hat{h}_{SA}(n)=R_{in,in}^{-1}(n)r_{ex,in}(n) \quad (8)$$

where $\hat{h}_{SA}(n)$ is the filter estimate at time n. $R_{in,in}(n)$ and $r_{ex,in}(n)$ are the running estimates of $E\{x_{in}^*(n)x_{in}^T(n)\}$ and $E\{x_{in}^*(n)x_{ex}(n)\}$, respectively. These running estimates can be computed as:

$$R_{in,in}(n)=R_{in,in}(n-1)+\alpha_{SA}(n)(x_{in}^*(n)x_{in}^T(n)-R_{in,in}(n-1)) \quad (9)$$

$$r_{ex,in}(n)=r_{ex,in}(n-1)+\alpha_{SA}(n)(x_{in}^*(n)x_{ex}(n)-r_{ex,in}(n-1)) \quad (10)$$

where $\alpha_{SA}(n)$ is an adaptive smoothing factor defined as:

$$\alpha_{SA}(n)=\alpha_{SA0}\Gamma_{SA}(n). \quad (11)$$

The base smoothing constant $\alpha_{SA0}$ determines how fast the running estimates are updated. It takes a value between 0 and 1, with the larger value corresponding to shorter base smoothing time window. The speech likelihood estimate $\Gamma_{SA}(n)$ also takes values between 0 and 1, with 1 indicating certainty of speech dominance and 0 indicating certainty of speech absence. This approach provides the adaptation control needed to minimize the impact of acoustic leakage and maintain the estimated spectral alignment filter unbiased. Details about $\Gamma_{SA}$ (n) will be further discussed below.

The filter adaptation shown in Eq. (8) can require matrix inversion. As the filter length N increases, this becomes both computationally complex and numerically challenging. In some embodiments, a least mean-square (LMS) adaptive filter implementation is adopted for the filter defined in Eq. (4):

$$\hat{h}_{SA}(n+1) = \hat{h}_{SA}(n) + \frac{\mu_{SA}\Gamma_{SA}(n)}{\|x_{in}(n)\|^2} x_{in}^*(n) e_{SA}(n) \tag{12}$$

where $\mu_{SA}$ is a constant adaptation step size between 0 and 1, $\|x_{in}(n)\|$ is the norm of vector $x_{in}(n)$, and $e_{SA}(n)$ is the spectral alignment error defined as:

$$e_{SA}(n)=x_{ex}(n)-x_{in}^T(n)\hat{h}_{SA}(n) \tag{13}$$

Similar to the direct approach shown in Eqs. (8)-(11), the speech likelihood estimate $\Gamma_{SA}(n)$ can be used to control the filter adaptation in order to minimize the impact of acoustic leakage on filter adaptation.

Comparing the two approaches, the LMS converges slower, but is more computationally efficient and numerically stable. This trade-off is more significant as the filter length increases. Other types of adaptive filtering techniques, such as fast affine projection (FAP) or lattice-ladder structure, can also be applied to achieve different trade-offs. The key is to design an effective adaptation control mechanism for these other techniques. In various embodiments, implementation in a suitable subband domain can result in a better trade-off on convergence, computational efficiency, and numerical stability. Subband-domain implementations are described in further detail below.

Subband-Domain Implementations

When converting time-domain signals into a subband domain, the effective bandwidth of each subband is only a fraction of the fullband bandwidth. Therefore, down-sampling is usually performed to remove redundancy and the down-sampling factor D typically increases with the frequency resolution. After converting the microphone signals $x_{ex}(n)$ and $x_{in}(n)$ into a subband domain, the signals in the k-th are denoted as $x_{ex,k}(m)$ and $x_{in,k}$ (m), respectively, where m is sample index (or frame index) in the down-sampled discrete time scale and is typically defined as m=n/D.

The spectral alignment filter defined in Eq. (3) can be converted into a subband-domain representation as:

$$h_{SA,k}=E\{x_{in,k}^*(m)x_{in,k}^T(m)\}^{-1}E\{x_{in,k}^*(m)x_{ex,k}(m)\} \tag{14}$$

which is implemented in parallel in each of the subbands (k=0, 1, . . . , K). Vector $h_{SA,k}$ consists of the coefficients of a length-M FIR filter for subband k:

$$h_{SA,k}=[h_{SA,k}(0)h_{SA,k}(1)\ \ldots\ h_{SA,k}(M-1)]^T \tag{15}$$

and $x_{ex,k}$ (m) and $x_{in,k}$ (m) are signal vectors consisting of the latest M samples of the corresponding subband signals at time m:

$$x_k(m)=[x_k(m)x_k(m-1)\ \ldots\ x_k(m-M+1)]^T. \tag{16}$$

In various embodiments, due to down-sampling, the filter length required in the subband domain to cover similar time span is much shorter than that in the time domain. Typically, the relationship between M and N is $M=\lceil N/D \rceil$. If the subband sample rate (frame rate) is at or slower than 8 mini-second (ms) per frame, as typically is the case for speech signal processing, M is often down to 1 for headset applications due to the proximity of all microphones. In that case, Eq. (14) can be simplified to:

$$h_{SA,k}=E\{x_{ex,k}(m)x_{in,k}^*(m)\}/E\{|x_{in,k}(m)|^2\} \tag{17}$$

where $h_{SA,k}$ is a complex single-tap filter. The subband spectrally-aligned internal microphone signal can be obtained by applying the subband spectral alignment filter to the subband internal microphone signal:

$$x_{in,align,k}(m)=h_{SA,k}x_{in,k}(m) \tag{18}$$

The direct adaptive filter implementation of the subband filter defined in Eq. (17) can be formulated as:

$$\hat{h}_{SA,k}(m)=r_{ex,in,k}(m)/r_{in,in,k}(m) \tag{19}$$

where $\hat{h}_{SA,k}(m)$ is the filter estimate at frame m, and $r_{in,in,k}$ (m) and $r_{ex,in,k}(m)$ are the running estimates of $E\{|x_{in,k}(m)|^2\}$ and $E\{x_{ex,k}(m)x_{in,k}^*(m)\}$, respectively. These running estimates can be computed as:

$$r_{in,in,k}(m)=r_{in,in,k}(m-1)+\alpha_{SA,k}(m)(|x_{in,k}(m)|^2-r_{in,in,k}(m-1)) \tag{20}$$

$$r_{ex,in,k}(m)=r_{ex,in,k}(m-1)+\alpha_{SA,k}(m)(x_{ex,k}(m)x_{in,k}^*(m)-r_{ex,in,k}(m-1)) \tag{21}$$

where $\alpha_{SA,k}(m)$ is a subband adaptive smoothing factor defined as $$\alpha_{SA,k}(m)=\alpha_{SA0,k}\Gamma_{SA,k}(m). \tag{22}$$

The subband base smoothing constant $\alpha_{SA0,k}$ determines how fast the running estimates are updated in each subband. It takes a value between 0 and 1, with larger value corresponding to shorter base smoothing time window. The subband speech likelihood estimate $\Gamma_{SA,k}(m)$ also takes values between 0 and 1, with 1 indicating certainty of speech dominance and 0 indicating certainty of speech absence in this subband. Similar to the case in the time-domain, this provides the adaptation control needed to minimize the impact of acoustic leakage and maintain the estimated spectral alignment filter unbiased. However, because speech signals often are distributed unevenly across frequency, being able to separately control the adaptation in each subband provides the flexibility of a more refined control and thus better performance potential. In addition, the matrix inversion in Eq. (8) is reduced to a simple division operation in Eq. (19), such that computational and numerical issues are greatly reduced. The details about $\Gamma_{SA,k}(m)$ will be further discussed below.

Similar to the time-domain case, an LMS adaptive filter implementation can be adopted for the filter defined in Eq. (17):

$$\hat{h}_{SA,k}(m+1) = \hat{h}_{SA,k}(m) + \frac{\mu_{SA}\Gamma_{SA,k}(m)}{\|x_{in,k}(m)\|^2} e_{SA,k}(m) x_{in,k}^*(m) \tag{23}$$

where $\mu_{SA}$ is a constant adaptation step size between 0 and 1, $\|x_{in,k}(m)\|$ is the norm of $x_{in,k}$ (m), and $e_{SA,k}(m)$ is the subband spectral alignment error defined as:

$$e_{SA,k}(m)=x_{ex,k}(m)-\hat{h}_{SA,k}(m)x_{in,k}(m). \tag{24}$$

Similar to the direct approach shown in Eqs. (19)-(22), the subband speech likelihood estimate $\Gamma_{SA,k}(m)$ can be used to control the filter adaptation in order to minimize the impact of acoustic leakage on filter adaptation. Furthermore, because this is a single-tap LMS filter, the convergence is significantly faster than its time-domain counterpart shown in Eq. (12)-(13).

Speech Likelihood Estimate

The speech likelihood estimate $\Gamma_{SA}(n)$ in Eqs. (11) and (12) and the subband speech likelihood estimate $\Gamma_{SA\ k}$ (m) in Eqs. (22) and (23) can provide adaptation control for the corresponding adaptive filters. There are many possibilities in formulating the subband likelihood estimate. One such example is:

$$\Gamma_{SA,k}(m) = \xi_{ex,k}(m)\xi_{in,k}(m)\min\left(\left|\frac{x_{in,k}(m)\hat{h}_{SA,k}(m)}{x_{ex,k}(m)}\right|^{\gamma}, 1\right) \quad (25)$$

where $\xi_{ex,k}(m)$ and $\xi_{in,k}(m)$ are the signal ratios in subband signals $x_{ex,k}(m)$ and $x_{in,k}(m)$, respectively. They can be computed using the running noise power estimates ($P_{NZ,ex,k}(m)$, $P_{NZ,in,k}(m)$) or SNR estimates ($SNR_{ex,k}(m)$, $SNR_{ex,k}(m)$) provided by the NT/NR modules 602, such as:

$$\xi_k(m) = \frac{SNR_k(m)}{SNR_k(m)+1} \text{ or } \max\left(1 - \frac{P_{NZ,k}(m)}{|x_k(m)|^2}, 0\right) \quad (26)$$

As discussed above, the estimator of spectral alignment filter in Eq. (3) exhibits bi-modal distribution when there is significant acoustic leakage. Because the mode associated with voice generally has a smaller conditional mean than the mode associated with noise, the third term in Eq. (25) helps exclude the influence of the noise mode.

For the speech likelihood estimate $\Gamma_{SA}(n)$, one option is to simply substitute the components in Eq. (25) with their fullband counterpart. However, because the power of acoustic signals tends to concentrate in the lower frequency range, applying such a decision for time-domain adaptation control tends to not work well in the higher frequency range. Considering the limited bandwidth of voice at the internal microphone 106, this often leads to volatility in high frequency response of the estimated spectral alignment filter. Therefore, using perceptual-based frequency weighting, in various embodiments, to emphasize high-frequency power in computing the fullband SNR will lead to more balanced performance across frequency. Alternatively, using a weighted average of the subband speech likelihood estimates as the speech likelihood estimate also achieves a similar effect.

Microphone Signal Blending (MSB) Module

The primary purpose of the MSB module 608 is to combine the external microphone signal $x_{ex}(n)$ and the spectrally-aligned internal microphone signal $x_{in,align}(n)$ to generate an output signal with the optimal trade-off between noise reduction and voice quality. This process can be implemented in either the time domain or subband domain. While the time-domain blending provides a simple and intuitive way of mixing the two signals, the subband-domain blending offers more control flexibility and thus a better potential of achieving a better trade-off between noise reduction and voice quality.

Time-Domain Blending

The time-domain blending can be formulated as follows:

$$s_{out}(n)=g_{SB}x_{in,align}(n)+(1-g_{SB})x_{ex}(n) \quad (27)$$

where $g_{SB}$ is the signal blending weight for the spectrally-aligned internal microphone signal which takes value between 0 and 1. It can be observed that the weights for $x_{ex}(n)$ and $x_{in,align}(n)$ always sum up to 1. Because the two signals are spectrally aligned within the effective bandwidth of the voice in ear canal, the voice in the blended signal should stay consistent within this effective bandwidth as the weight changes. This is the primary benefit of performing amplitude and phase alignment in the MSA module 606.

Ideally, $g_{SB}$ should be 0 in quiet environments so the external microphone signal should then be used as the output in order to have a natural voice quality. On the other hand, $g_{SB}$ should be 1 in very noisy environment so the spectrally-aligned internal microphone signal should then be used as the output in order to take advantage of its reduced noise due to acoustic isolation from the outside environment. As the environment transits from quiet to noisy, the value of $g_{SB}$ increases and the blended output shifts from an external microphone toward an internal microphone. This also results in gradual loss of higher frequency voice content and, thus, the voice can become muffle sounding.

The transition process for the value of $g_{SB}$ can be discrete and driven by the estimate of the noise level at the external microphone ($P_{NZ,ex}$) provided by the NT/NR module 602. For example, the range of noise level may be divided into (L+1) zones, with zone 0 covering quietest conditions and zone L covering noisiest conditions. The upper and lower thresholds for these zones should satisfy:

$$T_{SB,Hi,0}<T_{SB,Hi,1}< \ldots <T_{SB,Hi,L-1}$$

$$T_{SB,Lo,1}<T_{SB,Lo,2}< \ldots <T_{SB,Lo,L} \quad (28)$$

where $T_{SB,Hi,l}$ and $T_{SB,Lo,l}$ are the upper and lower thresholds of zone l, l=0, 1, . . . , L. It should be noted that there is no lower bound for zone 0 and no upper bound for zone L. These thresholds should also satisfy:

$$T_{SB,Lo,l+1}\le T_{SB,Hi,l}\le T_{SB,Lo,l+2} \quad (29)$$

such that there are overlaps between adjacent zones but not between non-adjacent zones. These overlaps serve as hysteresis that reduces signal distortion due to excessive back-and-forth switching between zones. For each of these zones, a candidate $g_{SB}$ value can be set. These candidates should satisfy:

$$g_{SB,0}=0\le g_{SB,1}\le g_{SB,2}\le \ldots \le g_{SB,L-1}\le g_{SB,L}=1. \quad (30)$$

Because the noise condition changes at a much slower pace than the sampling frequency, the microphone signals can be divided into consecutive frames of samples and a running estimate of noise level at an external microphone can be tracked for each frame, denoted as $P_{NZ,ex}(m)$, where m is the frame index. Ideally, perceptual-based frequency weighting should be applied when aggregating the estimated noise spectral power into the fullband noise level estimate. This would make $P_{NZ,ex}(m)$ better correlate to the perceptual impact of current environment noise. By further denoting the noise zone at frame m as $\Lambda_{SB}(m)$, a state-machine based algorithm for the MSB module 608 can be defined as:

1. Initialize frame 0 as being in noise zone 0, i.e., $\Lambda_{SB}(0)=0$.

2. If frame (m−1) is in noise zone l, i.e., $\Lambda_{SB}(m-1)=l$, the noise zone for frame m, $\Lambda_{SB}(m)$ is determined by comparing the noise level estimate $P_{NZ,ex}(m)$ to the thresholds of noise zone l:

$$\Lambda_{SB}(m) = \begin{cases} l+1, & \text{if } P_{NZ,ex}(m) > T_{SB,Hi,l}, \quad l \neq L \\ l-1, & \text{if } P_{NZ,ex}(m) < T_{SB,Lo,l}, \quad l \neq 0 \\ l, & \text{otherwise} \end{cases} \tag{31}$$

3. Set the blending weight for $x_{in,align}(n)$ in frame m as a candidate in zone $\Lambda_{SB}(m)$:

$$g_{SB}(m)=g_{SB,\Lambda_{SB}(m)} \tag{32}$$

and use it to compute the blended output for frame m based on Eq. (27).

4. Return to step 2 for the next frame.

Alternatively, the transition process for the value of $g_{SB}$ can be continuous. Instead of dividing the range of a noise floor estimate into zones and assigning a blending weight in each of these zones, the relation between the noise level estimate and the blending weight can be defined as a continuous function:

$$g_{SB}(m)=f_{SB}(P_{NZ,ex}(m)) \tag{33}$$

where $f_{SB}(\bullet)$ is a non-decreasing function of $P_{NZ,ex}(M)$ that has a range between 0 and 1. In some embodiments, other information such as noise level estimates from previous frames and SNR estimates can also be included in the process of determining the value of $g_{SB}(m)$. This can be achieved based on data-driven (machine learning) approaches or heuristic rules. By way of example and not limitation, examples of various machine learning and heuristic rules approaches are described in U.S. patent application Ser. No. 14/046,551, entitled "Noise Suppression for Speech Processing Based on Machine-Learning Mask Estimation", filed Oct. 4, 2013.

Subband-Domain Blending

The time-domain blending provides a simple and intuitive mechanism for combining the internal and external microphone signals based on the environmental noise condition. However, in high noise conditions, a selection would result between having higher-frequency voice content with noise and having reduced noise with muffled voice quality. If the voice inside the ear canal has very limited effective bandwidth, its intelligibility can be very low. This severely limits the effectiveness of either voice communication or voice recognition. In addition, due to the lack of frequency resolution in the time-domain blending, a balance is performed between the switching artifact due to less frequent but more significant changes in blending weight and the distortion due to finer but more constant changes. In addition, the effectiveness of controlling the blending weights, for the time domain blending, based on estimated noise level is highly dependent on factors such as the tuning and gain settings in the audio chain, the locations of microphones, and the loudness of user's voice. On the other hand, using SNR as a control mechanism can be less effective in the time domain due to the lack of frequency resolution. In light of the limitation of the time-domain blending, subband-domain blending, according to various embodiments, may provide the flexibility and potential for improved robustness and performance for the MSB module.

In subband-domain blending, the signal blending process defined in Eq. (27) is applied to the subband external microphone signal $x_{ex,k}(m)$ and the subband spectrally-aligned internal microphone signal $x_{in,align,k}(m)$ as:

$$s_{out,k}(m)=g_{SB,k}x_{in,align,k}(m)+(1-g_{SB,k})x_{ex,k}(m) \tag{34}$$

where k is the subband index and m is the frame index. The subband blended output $s_{out,k}(m)$ can be converted back to the time domain to form the blended output $s_{out}(n)$ or stay in the subband domain to be processed by subband processing modules downstream.

In various embodiments, the subband-domain blending provides the flexibility of setting the signal blending weight ($g_{SB,k}$) for each subband separately, thus the method can better handling the variabilities in factors such as the effective bandwidth of in-canal voice and the spectral power distributions of voice and noise. Due to the refined frequency resolution, SNR-based control mechanism can be effective in the subband domain and provides the desired robustness against variabilities in diverse factors such as gain settings in audio chain, locations of microphones, and loudness of user's voice.

The subband signal blending weights can be adjusted based on the differential between the SNRs in internal and external microphones as:

$$g_{SB,k}(m) = \left( \frac{(SNR_{in,k}(m))^{\rho_{SB}}}{(SNR_{in,k}(m))^{\rho_{SB}} + (\beta_{SB} SNR_{ex,k}(m))^{\rho_{SB}}} \right) \tag{35}$$

where $SNR_{ex,k}(m)$ and $SNR_{in,k}(m)$ are the running subband SNRs of the external microphone signal and internal microphone signals, respectively, and are provided from the NT/NR modules 602. $\beta_{SB}$ is the bias constant that takes positive values and is normally set to 1.0. $\rho_{SB}$ is the transition control constant that also takes positive values and is normally set to a value between 0.5 and 4.0. When $\beta_{SB}=1.0$, the subband signal blending weight computed from Eq. (35) would favor the signal with higher SNR in the corresponding subband. Because the two signals are spectrally aligned, this decision would allow selecting the microphone with lower noise floor within the effective bandwidth of in-canal voice. Outside this bandwidth, it would bias toward external microphone signal within the natural voice bandwidth or split between the two when there is no voice in the subband. Setting $\beta_{SB}$ to a number larger or smaller than 1.0 would bias the decision toward an external or an internal microphone, respectively. The impact of $\beta_{SB}$ is proportional to its logarithmic scale. $\rho_{SB}$ controls the transition between the microphones. Larger $\rho_{SB}$ leads to a sharper transition while smaller $\rho_{SB}$ leads to a softer transition.

The decision in Eq. (35) can be temporally smoothed for better voice quality. Alternatively, the subband SNRs used in Eq. (35) can be temporally smoothed to achieve similar effect. When the subband SNRs for both internal and external microphones signals are low, the smoothing process should slow down for more consistent noise floor.

The decision in Eq. (35) is made in each subband independently. Cross-band decision can be added for better robustness. For example, the subbands with relatively lower SNR than other subbands can be biased toward the subband signal with lower power for better noise reduction.

The SNR-based decision for $g_{SB,k}(m)$ is largely independent of the gain settings in the audio chain. Although it is possible to directly or indirectly incorporate the noise level estimates into the decision process for enhanced robustness against the volatility in SNR estimates, the robustness against other types of variabilities can be reduced as a result.

Example Alternative Usages

Embodiments of the present technology are not limited to devices having a single internal microphone and a single external microphone. For example, when there are multiple external microphones, spatial filtering algorithms can be applied to the external microphone signals first to generate a single external microphone signal with lower noise level while aligning its voice quality to the external microphone with the best voice quality. The resulting external microphone signal may then be processed by the proposed approach to fuse with the internal microphone signal.

Similarly, if there are two internal microphones, one in each of the user's ear canals, coherence processing may be first applied to the two internal microphone signals to generate a single internal microphone signal with better acoustic isolation, wider effective voice bandwidth, or both. In various embodiments, this single internal signal is then processed using various embodiments of the method and system of the present technology to fuse with the external microphone signal.

Alternatively, the present technology can be applied to the internal-external microphone pairs at the user's left and right ears separately, for example. Because the outputs would preserve the spectral amplitudes and phases of the voice at the corresponding external microphones, they can be processed by suitable processing modules downstream to further improve the voice quality. The present technology may also be used for other internal-external microphone configurations.

Figure 7:
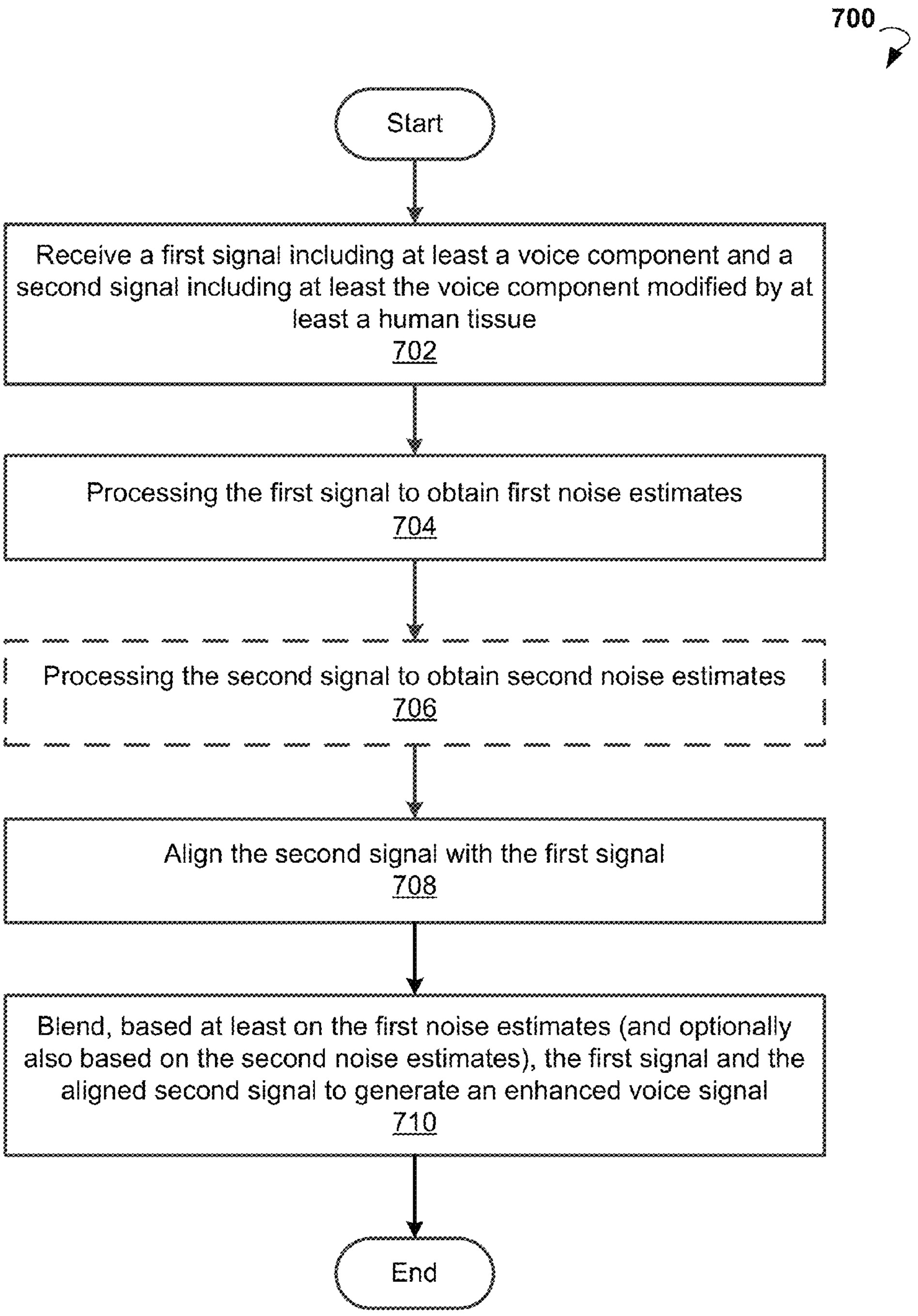
FIG. 7 is a flow chart showing a method for microphone signal fusion, according to an example embodiment.

FIG. 7 is flow chart diagram showing a method 700 for fusion of microphone signals, according to an example embodiment. The method 700 may be implemented using DSP 112. The example method 700 commences in block 702 with receiving a first signal and a second signal. The first signal represents at least one sound captured by an external microphone and includes at least a voice component. The second signal represents at least one sound captured by an internal microphone located inside an ear canal of a user, and includes at least the voice component modified by at least a human tissue. In place, the internal microphone may be sealed for providing isolation from acoustic signals coming outside the ear canal, or it may be partially sealed depending on the user and the user's placement of the internal microphone in the ear canal.

In block 704, the method 700 allows processing the first signal to obtain first noise estimates. In block 706 (shown dashed as being optional for some embodiments), the method 700 processes the second signal to obtain second noise estimates. In block 708, the method 700 aligns the second signal to the first signal. In block 710, the method 700 includes blending, based at least on the first noise estimates (and optionally also based on the second noise estimates), the first signal and the aligned second signal to generate an enhanced voice signal.

Figure 8:
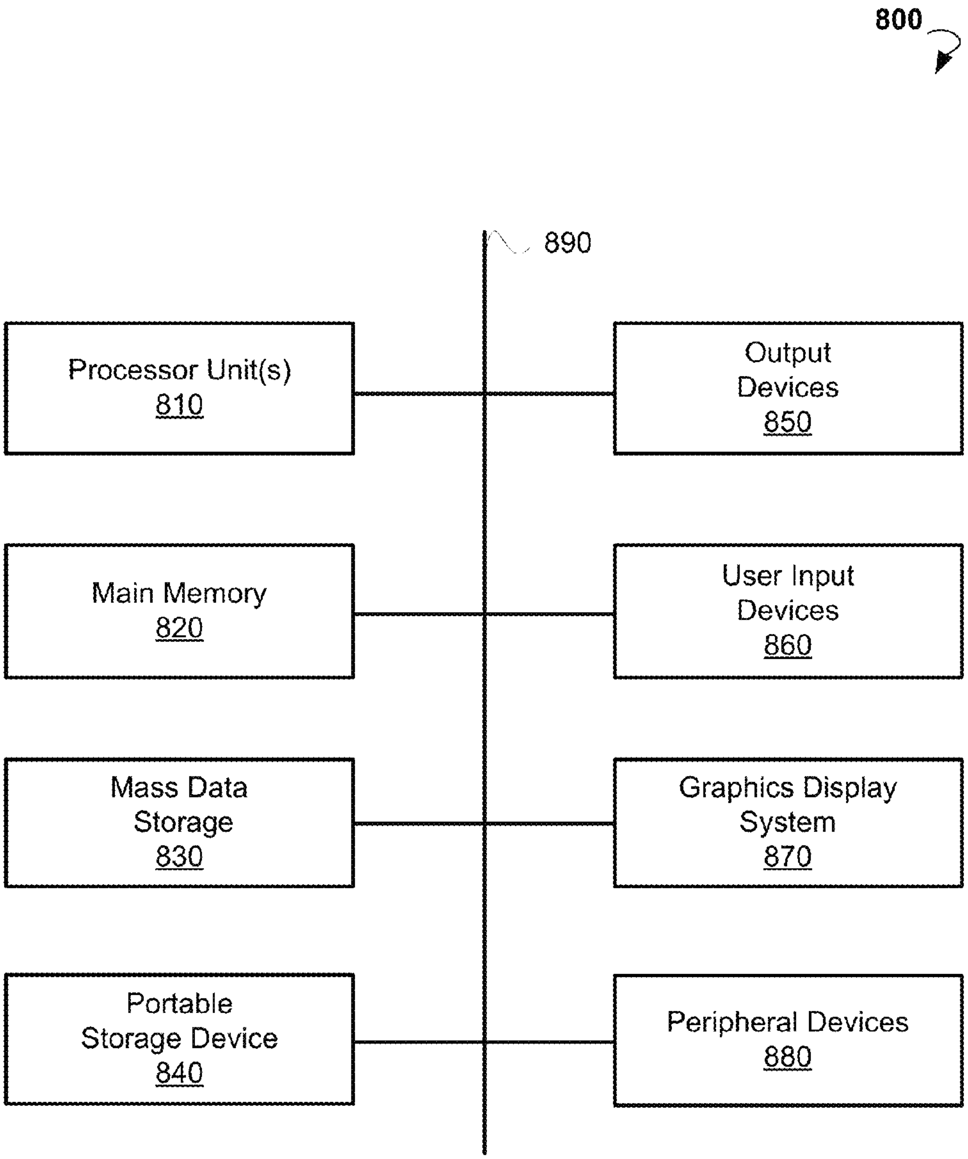
FIG. 8 is a computer system which can be used to implement methods for the present technology, according to an example embodiment.

FIG. 8 illustrates an exemplary computer system 800 that may be used to implement some embodiments of the present invention. The computer system 800 of FIG. 8 may be implemented in the contexts of the likes of computing systems, networks, servers, or combinations thereof. The computer system 800 of FIG. 8 includes one or more processor units 810 and main memory 820. Main memory 820 stores, in part, instructions and data for execution by processor units 810. Main memory 820 stores the executable code when in operation, in this example. The computer system 800 of FIG. 8 further includes a mass data storage 830, portable storage device 840, output devices 850, user input devices 860, a graphics display system 870, and peripheral devices 880.

The components shown in FIG. 8 are depicted as being connected via a single bus 890. The components may be connected through one or more data transport means. Processor unit 810 and main memory 820 is connected via a local microprocessor bus, and the mass data storage 830, peripheral device(s) 880, portable storage device 840, and graphics display system 870 are connected via one or more input/output (I/O) buses.

Mass data storage 830, which can be implemented with a magnetic disk drive, solid state drive, or an optical disk drive, is a non-volatile storage device for storing data and instructions for use by processor unit 810. Mass data storage 830 stores the system software for implementing embodiments of the present disclosure for purposes of loading that software into main memory 820.

Portable storage device 840 operates in conjunction with a portable non-volatile storage medium, such as a flash drive, floppy disk, compact disk, digital video disc, or Universal Serial Bus (USB) storage device, to input and output data and code to and from the computer system 800 of FIG. 8. The system software for implementing embodiments of the present disclosure is stored on such a portable medium and input to the computer system 800 via the portable storage device 840.

User input devices 860 can provide a portion of a user interface. User input devices 860 may include one or more microphones, an alphanumeric keypad, such as a keyboard, for inputting alphanumeric and other information, or a pointing device, such as a mouse, a trackball, stylus, or cursor direction keys. User input devices 860 can also include a touchscreen. Additionally, the computer system 800 as shown in FIG. 8 includes output devices 850. Suitable output devices 850 include loudspeakers, printers, network interfaces, and monitors.

Graphics display system 870 include a liquid crystal display (LCD) or other suitable display device. Graphics display system 870 is configurable to receive textual and graphical information and processes the information for output to the display device.

Peripheral devices 880 may include any type of computer support device to add additional functionality to the computer system.

The components provided in the computer system 800 of FIG. 8 are those typically found in computer systems that may be suitable for use with embodiments of the present disclosure and are intended to represent a broad category of such computer components that are well known in the art. Thus, the computer system 800 of FIG. 8 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 800 is implemented as a cloud-based computing environment, such as a virtual machine operating within a computing cloud. In other embodiments, the computer system 800 may itself include a cloud-based computing environment, where the functionalities of the computer system 800 are executed in a distributed fashion. Thus, the computer system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 800, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for fusion of microphone signals, the method comprising:

receiving a first signal including at least a voice component, the voice component of the first signal having a first frequency response, and a second signal including at least the voice component, the voice component of the second signal having a second frequency response that is modified from the first frequency response by at least transmission of the voice component through a human tissue;

processing the first signal to obtain first noise estimates;

aligning the voice component in the second signal spectrally with the voice component in the first signal by applying a filter to the second signal that causes the second frequency response to be altered toward the first frequency response within a bandwidth of the voice component of the second signal; and blending, based at least on the first noise estimates, the first signal and the aligned voice component in the second signal to generate an enhanced voice signal.

2. The method of claim 1, wherein the second signal represents at least one sound captured by an internal microphone located inside an ear canal.

3. The method of claim 2, wherein the internal microphone is at least partially sealed for isolation from acoustic signals external to the ear canal.

4. The method of claim 2, wherein the first signal represents at least one sound captured by an external microphone located outside the ear canal.

5. The method of claim 2, wherein the voice component of the second signal, representing the at least one sound captured by the internal microphone, comprises low frequency content and high frequency content.

6. The method of claim 5, wherein, prior to the aligning, the voice component of the second signal representing the at least one sound captured by the internal microphone is processed to emphasize the high frequency content.

7. The method of claim 6, wherein the emphasizing the high frequency content comprises applying perceptual-based frequency weighting to the high frequency content.

8. The method of claim 1, wherein the filter includes an adaptive filter calculated based on cross-correlation of the first signal and the second signal and auto-correlation of the second signal.

9. The method of claim 1, wherein the filter is derived from empirical data.

10. A system for fusion of microphone signals, the system comprising:

a digital signal processor, configured to:

receive a first signal including at least a voice component, the voice component of the first signal having a first frequency response, and a second signal including at least the voice component, the voice component of the second signal having a second frequency response that is modified from the first frequency response by at least transmission of the voice component through a human tissue;

process the first signal to obtain first noise estimates;

align the voice component in the second signal spectrally with the voice component in the first signal by applying a filter to the second signal that causes the second frequency response to be altered toward the first frequency response within a bandwidth of the voice component of the second signal; and blend, based at least on the first noise estimates, the first signal and the aligned voice component in the second signal to generate an enhanced voice signal.

11. The system of claim 10, wherein the second signal represents at least one sound captured by an internal microphone located inside an ear canal.

12. The system of claim 11, wherein the internal microphone is at least partially sealed for isolation from acoustic signals external to the ear canal.

13. The system of claim 11, wherein the first signal represents at least one sound captured by an external microphone located outside the ear canal.

14. The system of claim 11, wherein the voice component of the second signal, representing the at least one sound captured by the internal microphone, comprises low frequency content and high frequency content.

15. The system of claim 14, wherein, prior to the aligning, the voice component of the second signal representing the at least one sound captured by the internal microphone is processed to emphasize the high frequency content.

16. The system of claim 15, wherein the emphasizing the high frequency content comprises applying perceptual-based frequency weighting to the high frequency content.

17. The system of claim 10, wherein the filter includes an adaptive filter calculated based on cross-correlation of the first signal and the second signal and auto-correlation of the second signal.

18. The system of claim 10, wherein the filter is derived from empirical data.

19. A non-transitory computer-readable storage medium having embodied thereon instructions, which, when executed by at least one processor, perform steps of a method, the method comprising:

receiving a first signal including at least a voice component, the voice component of the first signal having a first frequency response, and a second signal including at least the voice component, the voice component of the second signal having a second frequency response that is modified from the first frequency response by at least transmission of the voice component through a human tissue, the first signal representing at least one sound captured by an external microphone located outside the ear canal, and the second signal representing at least one sound captured by an internal microphone located inside an ear canal;

processing the first signal to obtain first noise estimates;

aligning the voice component in the second signal spectrally with the voice component in the first signal by applying a filter to the second signal that causes the second frequency response to be altered toward the first frequency response within a bandwidth of the voice component of the second signal; and blending, based at least on the first noise estimates, the first signal and the aligned voice component in the second signal to generate an enhanced voice signal;

the voice component of the second signal, representing the at least one sound captured by the internal microphone, comprising low frequency content and high frequency content and, prior to the aligning, processing the voice component of the second signal, representing the at least one sound captured by the internal microphone, to emphasize the high frequency content.

* * * * *